United States Patent
Sue et al.

(10) Patent No.: US 11,932,718 B2
(45) Date of Patent: Mar. 19, 2024

(54) FUNCTIONALIZED EXFOLIATED NANOCLAY AND NON-POLAR POLYMER NANOCOMPOSITE COMPOSITIONS

(71) Applicants: The Texas A&M University, College Station, TX (US); Formosa Plastics Corporation, Mailiao (TW)

(72) Inventors: Hung-Jue Sue, College Station, TX (US); Joseph Baker, College Station, TX (US); Mingzhen Zhao, College Station, TX (US); Hong-Mao Wu, Mailiao (TW); Wen-Hao Kang, Mailiao (TW); Jen-Long Wu, Mailiao (TW)

(73) Assignees: The Texas A&M University System, College Station, TX (US); Formosa Plastics Corporation, Mailiao (TW)

( * ) Notice: Subject to any disclaimer, the term of this patent is extended or adjusted under 35 U.S.C. 154(b) by 224 days.

(21) Appl. No.: 17/203,361

(22) Filed: Mar. 16, 2021

(65) Prior Publication Data
US 2021/0284779 A1 Sep. 16, 2021

Related U.S. Application Data

(60) Provisional application No. 62/990,326, filed on Mar. 16, 2020.

(51) Int. Cl.
C08G 61/06 (2006.01)
C08F 292/00 (2006.01)

(52) U.S. Cl.
CPC .................. *C08F 292/00* (2013.01)

(58) Field of Classification Search
CPC ....... C08F 292/00; C08F 210/14; C08J 3/215; C08J 2323/06; C08G 2261/33; C08G 2261/3324; C08G 2261/724; C08G 2261/418; C08G 61/06

USPC ........................................ 523/204
See application file for complete search history.

(56) References Cited

U.S. PATENT DOCUMENTS

| | | | |
|---|---|---|---|
| 7,148,282 B2 | 12/2006 | Giannelis et al. | |
| 11,518,824 B2 * | 12/2022 | Mihan | C08F 4/02 |
| 2006/0155030 A1 | 7/2006 | Aupaix et al. | |
| 2008/0280031 A1 * | 11/2008 | Drzal | C08J 5/04 |
| | | | 427/78 |
| 2014/0193590 A1 * | 7/2014 | Sue | C08J 7/06 |
| | | | 427/427 |
| 2017/0121467 A1 * | 5/2017 | Tsou | C08L 23/0815 |
| 2020/0172408 A1 * | 6/2020 | Sue | C01B 25/372 |

OTHER PUBLICATIONS

Alberti, G. et al., "Inorganic Ion-Exchange Pellicles Obtained by Delamination of α-Zirconium Phosphate Crystals," Journal of Colloid and Interface Science, vol. 107, No. 1, Sep. 1985, pp. 256-263.
Li, P. et al., "Highly effective anti-corrosion epoxy spray coatings containing self-assembled clay in smectic order," Journals of Materials Chemistry A, vol. 3, 2015, 2669-2676.
Kaschak, D.M. et al., "Chemistry on the Edge: A Microscopic Analysis of the Intercalation, Exfoliation, Edge Functionalization, and Monolayer Surface Tiling Reactions of α-Zirconium Phosphate," Journal of the American Chemical Society, vol. 120, No. 42, 1998, 10887-10894.
Zhou, Y. et al., "Solid Acid Catalyst Based on Single-Layer α-Zirconium Phosphate Nanosheets for Biodiesel Production via Esterification," MDPI, Catalysts, vol. 8, No. 17, 2018, 8 pages.

* cited by examiner

*Primary Examiner* — Hannah J Pak
(74) *Attorney, Agent, or Firm* — Christensen O'Connor Johnson Kindness PLLC

(57) ABSTRACT

Exfoliated nanoplatelets functionalized with a non-polar moiety, such as an ethylene or propylene derived polymer, are useful for forming composites, films, and polymer blends.

12 Claims, 20 Drawing Sheets

| Rheology at 100°C, 0.1rad/s | Neat Polymer | ZrP-M1000 | ZrP-APTMS 3wt% | ZrP-APTMS 10wt% |
|---|---|---|---|---|
| Storage modulus (kPa) | 2 | 2.6 | 3.9 | 12 |
| Viscosity (kPa s) | 47 | 55 | 76 | 170 |
| Tan δ | 2.16 | 1.84 | 1.69 | 0.95 |

*FIG. 3D*

| | neat PE-co-VAc | PE-co-VAc/ZrP | PE-co-VAc/ZrP-APTMS | PE-co-VAc/ZrP-M1000 |
|---|---|---|---|---|
| Crystallinity (Same thermal history) | 10% | | 7.0% | 8.5% |
| Young's Modulus (GPa) | 0.24 | | 0.86 | 0.34 |

*FIG. 5B*

| OTR Samples | cc/[m²·day] Test in 1cm² | Standard deviation |
|---|---|---|
| neat PE-co-VAc | 5300 | 15 |
| PE-co-VAc/ZrP-APTMS 10wt% | 3500 | 330 |
| PE-co-VAc/ZrP-APTMS (Si gel purified) 2.5wt% | 3300 | 140 |
| Standard PET | 35 | 5 |

FIG. 6B

PE nanocomposites rheological properties from literature

| Storage modulus and viscosity at 0.1 rad/s | HDPE/MMT (maleic PE as compatilizer) | HDPE/MWNT | HDPE/silica | HDPE/ZrP-ROMP |
|---|---|---|---|---|
| Temperature °C | 160 | 140 | 190 | 205 |
| Weight fraction of filler | 5wt% | 1.04wt% | 5wt% | 1.5wt% |
| Mn of HDPE | 17,300 g/mol | 84,000 g/mol | - | 10,000 g/mol |
| Storage modulus of composites | 10,000 | 1000 | 1800 | 5000 |
| Storage modulus of HDPE | 4000 | 600 | 1500 | 1500 |
| Storage modulus increased by (times) | 2.5 | 1.67 | 1.2 | 3.3 |
| Viscosity of composites | 50,000 | 70,000 | 110,000 | 67,000 |
| Viscosity of HDPE | 30,000 | 60,000 | 80,000 | 33,000 |
| Viscosity increased by (times) | 1.67 | 1.16 | 1.375 | 2 |
| Reference | Applied Clay Science 150 (2017): 244-251. | Macromolecules 47.16 (2014): 5668-5681. | Journal of Polymer Science Part B: Polymer Physics 57.9 (2019): 535-546. | - |

FIG. 10

FUNCTIONALIZED EXFOLIATED NANOCLAY AND NON-POLAR POLYMER NANOCOMPOSITE COMPOSITIONS

CROSS-REFERENCE TO RELATED APPLICATION

This application claims the benefit of Application No. 62/990,326, filed Mar. 16, 2020, the disclosure of which is hereby incorporated by reference in its entirety.

BACKGROUND OF THE INVENTION

Nanoclay platelets have been incorporated into polymeric matrices to improve the ability of such matrices to act as barriers to oxygen and water. These properties are particularly useful for food packaging films.

Despite the advances in the development of polymeric matrices and films that serve as barriers to oxygen and water, a need exists for improved polymeric matrices and improved nanoclay platelet compositions for these matrices. The present invention seeks to fulfill these needs and provide further related advantages.

SUMMARY OF THE INVENTION

In one aspect, the invention provides a functionalized exfoliated nanoplatelet. In certain embodiments, the invention provides a composition comprising an exfoliated nanoplatelet functionalized with a non-polar moiety. The exfoliated nanoplatelet is functionalized with a non-polar moiety to advantageously facilitate further processing of the nanoplatelet as described herein. The non-polar moiety is associated with platelet through a bonding interaction. As used herein, the term, "non-polar moiety" includes hydrocarbon moieties that are branched or straight chain hydrocarbon moieties having at least about 10 carbon atoms. The length (upper limit of carbon atoms) the hydrocarbon moiety can be adjusted to suit the application. In certain embodiments, the hydrocarbon chain has at least about 12 carbon atoms. In other embodiments, the hydrocarbon chain has at least about 20 carbon atoms. In further embodiments, the hydrocarbon chain has about 1000 carbon atoms. In other embodiments, the hydrocarbon chain has about 10,000, about 20,000, about 30,000, or about 50,000 carbon atoms. In one embodiment, the hydrocarbon has about 35,000 carbon atoms (as measured by GPC).

In certain embodiments, the non-polar moiety is associated with the platelet through a hydrogen bonding interaction. For example, the hydrogen bonding interaction between the amine group of ZrP/APTMS and the ester group of PE-co-VAc.

In other embodiments, the non-polar moiety is covalently coupled to the nanoplatelet. For example, the covalent coupling of a polyethylene group to the platelet resulting from an olefin metathesis reaction, such as a ring-opening olefin metathesis reaction in the presence of a transition metal catalyst.

In certain embodiments, the non-polar moiety is associated with the platelet through a silane that is covalently coupled to the platelet. In certain of the embodiments, the lower and upper limits of the silane is 1 to 70% (calculated by TGA (thermogravimetric analysis) and solid-state NMR (nuclear magnetic resonance)). The preferred density varies based on different application and the requirement of maintaining ZrP exfoliation. For the ZrP-APTMS case, APTMS grafting is 10 mol % to the POH (—P(O)OH groups on the surface of the nanoplatelet). For the ZrP-NTES-ETMS, NTES: 10 mol %, ETMS: 40 mol % to the POH.

In certain embodiments, the non-polar moiety is produced by an olefin metathesis reaction. In certain embodiments, the non-polar moiety is produced by a ring-opening olefin metathesis reaction in the presence of a transition metal catalyst. In certain embodiments of these embodiments, the ring-opening olefin metathesis reaction is a reaction between an alkene covalently coupled to the platelet and a cycloalkene, wherein the alkene is selected from the group consisting of a vinyl group and cyclic and polycyclic olefins (e.g., a norbornyl group).

In the composition, the exfoliated nanoplatelet is derived from a natural or synthetic nanoclay.

In another embodiment, the invention provides a film comprising the functionalized exfoliated nanoplatelet as described herein.

In another aspect of the invention, nanocomposite compositions are provided. In certain embodiments, the invention provides a nanocomposite composition comprising a mixture the functionalized exfoliated nanoplatelet as described herein and a polymer derived from ethylene or propylene. In certain embodiments of these embodiments, the invention provides a polymer derived from ethylene and/or propylene (e.g., polyethylene (PE), polypropylene) or a copolymer derived from ethylene and/or propylene (e.g., PE-co-PAc). In certain embodiments, the invention provides a blend comprising the functionalized exfoliated nanoplatelet as described herein and a polymer having ethylene or propylene units, wherein the non-polar moiety of the composition is a silane with a free amine or free hydroxy group, and wherein the polymer is modified to be absorbed to nanoplatelets by the free amine or free hydroxy group. In other embodiments, the invention provides a blend comprising a copolymer of polyvinyl acetate and polyethylene or polypropylene and the functionalized exfoliated nanoplatelet as described herein, wherein the non-polar moiety of the composition is a silane with a free amine or free hydroxy group.

In certain embodiments, the nanocomposite composition exhibits a modulus increase of 100% relative to the polymer containing no filler, as measured by dynamic mechanical analysis (DMA).

In certain embodiments, the nanocomposite composition exhibits a modulus increase of 150% relative to the polymer containing no filler, as measured by tensile test.

In another embodiment, the invention provides a film comprising the nanocomposite composition as described herein.

In a further aspect of the invention, lyotropic suspensions are provided. In certain embodiments, the invention provides a lyotropic suspension, comprising the functionalized exfoliated nanoplatelet as described herein and an organic medium (e.g., a polymer or a solvent). Representative solvents include methanol, dichloromethane, acetone, tetrahydrofuran, toluene, and xylene. Representative polymers include PE-co-VAc and polycyclooctene (PCO).

In another aspect, the invention provides methods for producing the exfoliated nanoplatelet as described herein. In certain embodiments, the method comprises:
(a) covalently coupling a silane to an exfoliated nanoplatelet, wherein the silane has a functional group for associating a polymer to the nanoplatelet;
(b) associating a polymer comprising a hydrocarbon-chain with at least 20 carbons to the nanoplatelet through the functional group of the silane.

In certain embodiments, the functional group of the silane is a hydroxy group or an amine group and the polymer. In certain of these embodiments, the polymer is associated to nanoplatelet through a hydrogen bonding interaction.

In other embodiments, the functional group of the silane is an alkene group (e.g., vinyl or norbornyl group). In certain of these embodiments, the polymer is associated to nanoplatelet through covalent coupling (e.g. ROMP).

In certain embodiments, the polymer comprising a hydrocarbon-chain with at least 20 carbons is a polymer derived from ethylene or propylene (e.g., PE and PE-copolymers).

In a further aspect, the invention provides a method for producing an exfoliated nanoplatelet functionalized with a covalently-bound non-polar moiety containing a hydrocarbon-chain with at least 20 carbons, wherein the polymer has a controlled graft density and controlled molecular weight.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings.

FIGS. 3A-3D compare of rheology properties containing well-exfoliated ZrP (ZrP-APTMS) and intercalated ZrP (ZrP-M1000): complex viscosity (3A), storage modulus (3B), and Tan δ (3C). FIG. 3D tabulates the results.

FIG. 5B tabulates the results.

FIG. 6B tabulates the results.

FIG. 10 compares PE nanocomposites rheological properties. In FIG. 10, "HDPE/ZrP-ROMP" refers to a representative HDPE/ZrP nanocomposite of the invention.

DETAILED DESCRIPTION OF THE INVENTION

Figure 1A:
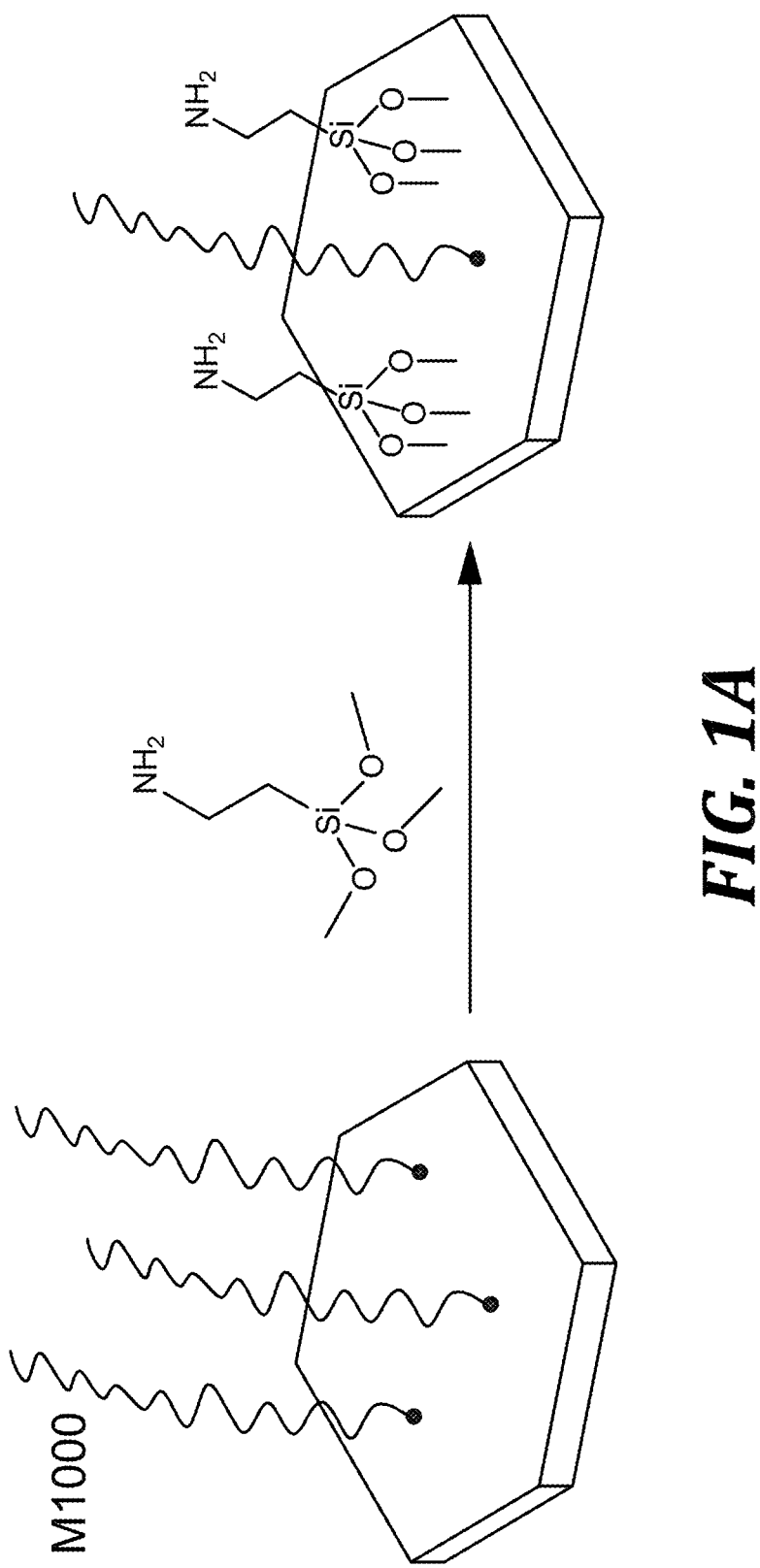
FIG. 1A is a schematic illustration of a representative nanoplatelet functionalized with an alkoxysilane having a free amine (APTMS).

The present invention provides exfoliated nanoplatelets functionalized with a non-polar moiety, nanocomposite compositions that include the functionalized nanoplatelets, methods for making and using functionalized nanoplatelets and nanocomposite compositions, and compositions that include the nanocomposite compositions.

Functionalized, exfoliated nanoplatelets are disclosed that can be dispersed in solvents and polymers derived from olefinic monomers (e.g., olefinic polymers). These nanoplatelets can be added to thermoplastics to improve properties such as barrier to oxygen and water, as well as mechanical and other functional properties. These nanoplatelets are prepared using a two-step process. The first step is to separate (exfoliate) individual nanoplatelets from a particle containing numerous stacked nanoplatelets. This is done using a surfactant that is bound to the surface by ionic bonds on the surface of the nanoplatelet. In the second step of the process, the surfactant is partially replaced or completely replaced with a covalently bound moiety that prevents aggregation of the nanoplatelets in solvents (e.g., non-polar, hydrophobic) and polymers.

In one aspect, the invention provides a composition comprising an exfoliated nanoplatelet functionalized with a non-polar moiety. Suitable non-polar moieties contain a hydrocarbon-chain with at least 20 carbons. In certain embodiments, the non-polar moiety is produced by covalently coupling a silane (e.g., having a free amine or hydroxy group) to the nanoplatelet. In other embodiments, the non-polar moiety is produced by an olefin metathesis reaction. In further embodiments, the non-polar moiety is produced by a ring-opening olefin metathesis reaction in the presence of a transition metal catalyst. The non-polar moiety is associated with the nanoparticle either through covalent coupling (e.g., covalently-bound non-polar moiety) or a hydrogen bonding interaction.

The exfoliated nanoplatelet may be derived from a natural or synthetic nanoclay. Representative natural nanoclays include montmorillonite, saponite, hectorite, mica, vermiculite, bentonite, nontronite, beidellite, volkonskoite, magadite, cloisite, kaolinite, kenyaite, and silicate-based nanoclays. Representative synthetic nanoclays include alpha zirconium phosphate (ZrP), layered double hydroxides, and other synthetic nanoclays as described in Utracki, L. A., et al, Synthetic, layered nanoparticles for polymeric nanocomposites (PNCs), Polym. Adv. Technol 18: 1-36 (2007), expressly incorporated herein by reference.

In another aspect, the invention provides a film comprising exfoliated nanoplatelets functionalized with a non-polar moiety.

In a further aspect, the invention provides a nanocomposite composition, comprising a mixture of the exfoliated nanoplatelet functionalized with a non-polar moiety, as described herein, and a hydrophobic polymer, such as a polymer derived from ethylene or propylene. Suitable polymers derived from polyethylene (PE) include copolymers, such as PE-polyvinyl acetate (PE-PVAc), PE-polystyrene, PE-polypropylene, and PE-butadiene. In certain embodiments, the nanocomposite composition exhibits a modulus increase of 100% as measured by dynamic mechanical analysis (DMA). In a related embodiment, the invention provides a film comprising the nanocomposite composition, as described herein.

In another aspect, the invention provides a lyotropic suspension, comprising the exfoliated nanoplatelet functionalized with a non-polar moiety, as described herein, and an organic medium (e.g., a polymer or a solvent).

In further aspects, the invention provides methods for producing an exfoliated nanoplatelet functionalized with a non-polar moiety containing a hydrocarbon-chain with at least 20 carbons, such as a polymer, wherein the polymer has a controlled graft density and controlled molecular weight.

The present invention also provides blends that, in some cases, achieve homogenized dispersion through secondary bonding, especially for copolymer types, such as PE-polyvinyl alcohol.

In certain embodiments, the blend comprises the exfoliated nanoplatelet functionalized with a non-polar moiety, as described herein, and a polymer having ethylene or propylene units, wherein the non-polar moiety of the composition is a silane with a free amine or free hydroxy group, and wherein the polymer is modified to be absorbed to nanoplatelets by the free amine or free hydroxy group. Useful silanes include silanes having amine end group, such as (3-aminopropyl)trimethoxysilane, [3-(2-aminoethylamino) propyl]trimethoxysilane, 3-[2-(2-aminoethylamino)ethylamino]-propyltrimethoxysilane, [3-(methylamino)propyl] trimethoxysilane, and useful silanes include silanes having hydroxyl amine end group, such as hydroxymethyltriethoxysilane and N-(hydroxyethyl)-N-methylaminopropyltrimethoxysilane.

In other embodiments, the blend comprises a copolymer of polyvinyl acetate and polyethylene or polypropylene (e.g., PVA-co-PE or PVA-co-PP) and the exfoliated nanoplatelet functionalized with a covalently-bound non-polar moiety, as described herein, wherein the non-polar moiety of the composition is a silane with a free amine or free hydroxy group.

In certain aspects, the invention provides exfoliated nanoclay (also referred to herein as nanoplatelets) are covalently modified with non-polar moieties including polyolefins (polyethylene/polypropylene) from an exfoliated state. These modified nanoplatelets are stable (remain exfoliated) in polyolefin (polyethylene/polypropylene) matrices and therefore result in improved material properties. Nanocomposites from these modified nanoplatelets can be synthesized easily with direct mixing methods as described herein.

Example property enhancements of polyolefins with exfoliated nanoplatelets include increased oxygen and moisture barrier, and increased modulus and increased melt strength, for materials (e.g., films) that include the functionalized nanoplatelets. The difference in the surface-functionalization described herein and others reported previously is that the surface-functionalization of the non-polar moieties on a representative nanoclay, zirconium phosphorus (ZrP), is done directly from an exfoliated state with a surfactant attached to the platelets. In the functionalized nanoplatelets, the non-polar moieties are covalently bound to the platelet surface.

These functionalized nanoplatelet-containing compositions of the invention are useful for packaging materials: the nanoplatelets reduce oxygen diffusion rates, and therefore allow inexpensive polyethylene films to compete with more expensive films such as vinylidene chloride copolymers (e.g., SARAN®) and poly(ethylene vinyl alcohol) (EVOH). The functionalized nanoplatelet can also be used as a reinforcement agent to greatly improve mechanical properties of the polymer.

For food packaging, SARAN® and EVOH have good barrier to oxygen, and currently share the market for food packaging for items such as meat. Both films are significantly more expensive than polyethylene film and neither SARAN® nor EVOH can be recycled, which is disadvantageous.

The methods of the invention allow for the preparation of exfoliated functionalized nanoplatelets which remain exfoliated in polyolefins with simple processing methods. This benefit has not been previously achieved and opens up many possibilities for improving polymer properties.

This disclosure describes dispersions of high aspect ratio exfoliated nanoplatelets in non-polar polymers, for example, polymers that are hydrocarbons of ethylene or propylene units, optionally in combination with other monomers. A key part of this invention are new nanoplatelet compositions that are functionalized with non-polar moieties. These nanoplatelets can be exfoliated nanoplatelets that can be dispersed in solvents and non-polar polymers. These nanoplatelets can be added to thermoplastics to improve properties such as barrier to oxygen and water, as well as mechanical and other functional properties such as increased modulus.

Nanoplatelet Functionalization and Nanocomposite Preparation

In the practice of the invention, nanoplatelets are prepared using a two-step process. The first step is to separate (exfoliate) individual nanoplatelets from a particle containing numerous stacked nanoplatelets. This is done using a surfactant that is bound to the surface by ionic bonds (or coordinate bonding) on the surface of the nanoplatelet. In the second step of the process, the surfactant is partially replaced or completely replaced with a covalently bound, non-polar moiety that prevents aggregation of the nanoplatelets in non-polar solvents and polymers.

This two-step process converts multilayered particles with low aspect ratios (<10) to individual nanoplatelets with high aspect ratios (>50).

It is desirable to exfoliate nearly all of the starting particles for two reasons. Non-exfoliated or partially exfoliated stacks of nanoplatelets are undesirable because they represent a yield-loss and because their presence can limit the ability of the nanoplatelets to improve properties.

There are various means to demonstrate the extent of exfoliation, including dynamic light scattering, X-ray scattering, X-ray diffraction, electron microscopy, and atomic force microscopy. Well-exfoliated, concentrated suspensions of nanoplatelets in polymers or solvents exhibit self-assembly, meaning that at least in small regions the nanoplatelets align to their neighbors. To check for self-assembly phenomena, one simple method is to test whether the suspensions are capable of rotating polarized light by placing a sample between a pair of polarizing films placed at 90 degrees. Samples with a high concentration of exfoliated nanoplatelets will appear bright with regions of different colors. Another term for this behavior is liquid crystallinity. Suspensions of nanoclays that contain an insufficient concentration of exfoliated nanoplatelets appear dark in cross-polarizers. The observance of the visible refraction of light is dependent on a number of factors, but the two most important factors are the aspect ratio of the particles (higher is better) and the concentration. A second test for self-assembly behavior of nanoplatelets is small-angle x-ray scattering (SAXS). Suspensions or nanocomposites of highly concentrated nanoplatelets that align to their neighbors will have a preferred spacing and often a bulk orientation SAXS can detect. The spacing of the nanoplatelets will be much larger if exfoliated (4-50 nm) but the actual number depends on the modifiers on the platelets as well as solvent or polymer and the actual nanoplatelet concentration.

This invention discloses a method for preparing covalently functionalized exfoliated nanoplatelets that have the capability of exhibiting liquid crystalline behavior at higher concentrations in solvents or can be proven to be exfoliated at lower concentrations with DLS (dynamic light scattering)/ microscopy. The resulting compositions are also described, as well as dispersions in polyolefins.

A general procedure for preparing these materials consists of two steps. In the first step, the layered nanoclay is exfoliated with a surfactant to form a suspension of high aspect ratio nanoplatelets in a solvent or monomer. This step is performed using techniques as described in H.-J. Sue, *J. Mater. Chem.* A., 2015, 3, 2669-2676). In one representative example, a synthetic nanoclay, alpha-zirconium phosphate (referred to herein as ZrP) is exposed to a surfactant in a polar solvent. The use of high-shear mixing may be advantageous. The product of this step is a stable suspension of nanoplatelets (coated on both sides with the surfactant) in a polar solvent. The nanoplatelets in layered nanoclays are bound together by hydrogen bonds formed between hydroxyl groups (such as —P(O)OH or —SiOH). The surfactant forms an ionic bond (or coordination bonding) with the surface hydroxyl groups and prevents aggregation of the isolated nanoplatelets. This reaction is reversible, meaning there is an equilibrium between the product, an anion-cation pair, and the neutral starting materials (the surfactant and the nanoplatelet).

Useful layered nanoclays that can be advantageously used in the methods of the invention include natural nanoclays and synthetic nanoclays.

Representative natural nanoclays include montmorillonite, saponite, hectorite, mica, vermiculite, bentonite, nontronite, beidellite, volkonskoite, magadite, cloisite, kaolinite, kenyaite, and silicate-based nanoclays (see U.S. Pat. No. 7,148,282).

Representative synthetic nanoclays include alpha zirconium phosphate (ZrP) (see US 20060155030A). Others synthetic nanoclays useful in the invention include layered double hydroxides and those described in Utracki, L. A., et. al, Synthetic, layered nanoparticles for polymeric nanocomposites (PNCs), *Polym. Adv. Technol* 18: 1-36 (2007), expressly incorporated herein by reference.

Useful surfactants effective in the first step of the process include polyols that have a terminal amine group. Other useful surfactants include ammonium salts such as tetrabutylammonium hydroxide.

Useful solvents effective in the first step of the process include water, methanol, ethanol, isopropanol, acetone, 2-butanone, cyclohexanone, diethyl ether, tetrahydrofuran, and glymes (such as 1,2-dimethoxyethane).

The next step is removal of the solvent, in some cases the surfactant, and disperse the nanoplatelets in non-polar solvents and polymers without causing aggregation of the nanoplatelets. In the second step, the surfactant is partially or completely removed and replaced with a non-polar surface-active agent that is covalently bound to the surface. This is performed by reacting the product from Step 1 with a non-polar reactant that contains at least one group that is capable of forming a covalent bond with the mildly acidic surface hydroxyl groups on the surface of the nanoplatelet (e.g., an alkoxysilane as described herein). A grafted free olefin is necessary for growing long hydrocarbon chains using olefin metathesis.

Reaction of the non-polar reactant with the nanoplatelet surface hydroxyls places a non-polar moiety on the surface that is covalently bound. It plays a key role in reducing the rate of aggregation of the nanoplatelets and can improve the dispersion with non-polar polymers such as polyethylene, polypropylene, and copolymers with other monomers, such as vinyl acetate, vinyl butyrate, methyl acrylate, butyl acrylate, methyl methacrylate, vinyl chloride, and acrylonitrile. As used herein, a "non-polar" moiety is defined as a material containing a hydrocarbon chain with one terminal group capable of covalently binding to the surface of the nanoplatelets. It is possible to replace a portion of the surfactant with one non-polar reactant, followed by replacement of all or a portion of the remaining surfactant with a second non-polar reactant. Examples of non-polar reactants include butyltrimethoxysilane, butyltriethoxysilane, dodecyltrimethoxysilane, 3-aminopropyltrimethoxysilane, vinyltrimethoxysilane, 5-bicyclo[2.2.1]hept-2-enyl)triethoxysilane, 2-methylpropene, 2-methylpentene, 2-methoxypropene, 2-methoxycyclohexene, 2-methoxycyclopentene. Additionally, the —P(O)OH or —SiOH groups on the surface of the nanoplatelets can be reacted with alcohols or alkyl halides under conditions that transform the OH groups to OR groups where R is a non-polar group, such as an alkyl group (for example, methyl, ethyl, butyl, hexyl, octyl, decyl, tetradecyl, hexadecyl, octadecyl), oleyl, or benzyl group. Ethoxy and methoxy groups are interchangeable, other silyl ethers will also work in this step.

Ring-opening Olefin Metathesis (ROMP). Hydrocarbon oligomers and polymers can be covalently bound to the surface using ring-opening olefin metathesis (ROMP) and a cyclic olefin. Conversion of the surface hydroxyl groups to a non-polar moiety is beneficial for stable exfoliation of the nanoplatelets and their ability to be dispersed in non-polar solvents and polymers. The length of the non-polar moiety can be tailored by adjusting ROMP conditions. For example, the use of excess cyclic olefin and long reaction times leads to long, high molecular weight chains. Long chains are preferred in order to prevent the nanoparticle from aggregating on mixing with non-polar polymers. However, short chains are preferable in order to minimize process times and the consumption of cyclic olefin raw materials. Preferred chain lengths are 20 to 10,000 carbons, with 20 to 100 most preferred.

The second step, removal of the surfactant from the exfoliated nanoplatelets, can be performed in two or more substeps. This allows for the surface of the nanoplatelets to be covered with two or more moieties. This process involves partial removal of the surfactant and reaction with one non-polar moiety, followed by complete removal of the excess surfactant and reaction with a second non-polar moiety. Although this complicates the synthesis procedure, it has the advantage that the surface characteristics of the nanoplatelets can be adjusted to maximize the compatibility when mixed with polyolefins. In this way a nanocomposite with optimal performance can be obtained on mixing the nanoplatelets with a non-polar polymer. It may be possible to prepare a nanoplatelet with mixed covalently-bound non-polar moieties in one step by starting with a mixture of reactants and controlling the composition of the product by changing the molar ratio of the reactants and/or relying on reaction rate differences.

Surface-initiated ROMP (SI-ROMP) has previously been achieved with nanofillers by grafting a norbornyl or vinyl group on the filler surface that can immobilize Grubb's catalyst and initiate ROMP (ACS Macro Letters 8.3 (2019): 228-232; Macromolecules 46.23 (2013): 9324-9332; and Polymer 153 (2018): 287-294) to provide the functionalized nanoplatelets. Nanofillers studied thus far have been spherical (silica), 2D nanoplatelets (montmorillonite (MMT)), and carbon nanotubes. The polyethylene chains on the silica surface were shown to improve dispersion of the particles when mixed with neat high-density polyethylene (HDPE). For 2D nanoplatelets, MMT was intercalated with a norbornyl functional group bound to the surface via an ionic interaction. Mechanical properties of the nanocomposite were significantly enhanced after the polyolefin was grown from the MMT surface. However, the SI-ROMP reported currently based on 2D nanoplatelets was induced from an intercalated structure. SI-ROMP can increase MMT interlayer distance, but cannot achieve exfoliation of the nanoplatelets after ROMP, which limits the nanocomposites property enhancement.

In certain aspects, the invention provides a nanoplatelet with covalently bound norbornyl functionality directly on an exfoliated ZrP surface, which can be used to generate the stable covalent grafting of polyethylene. The polyethylene (PE)-grafted ZrP can be directly mixed in solvent with neat HDPE and maintain exfoliation after drying.

Representative Functionalized Exfoliated Nanoplatelets and Nanocomposites

Figure 1B:
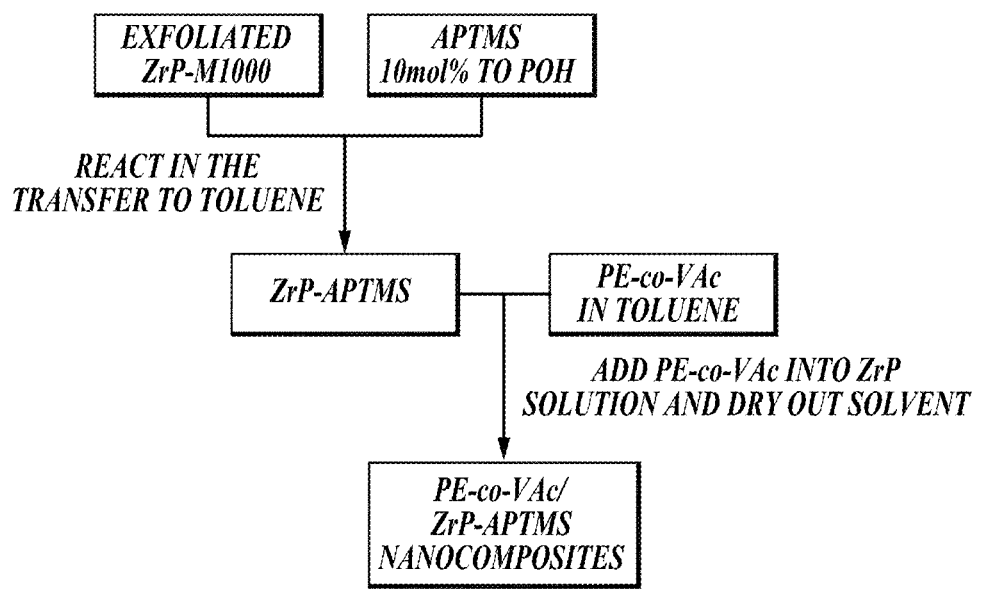
FIG. 1B is a schematic illustration of the preparation of a representative nanocomposite of the invention, PE-co-VAc/ZrP, from nanoplatelet functionalization with an alkoxysilane having a free amine (APTMS).
Figure 2:
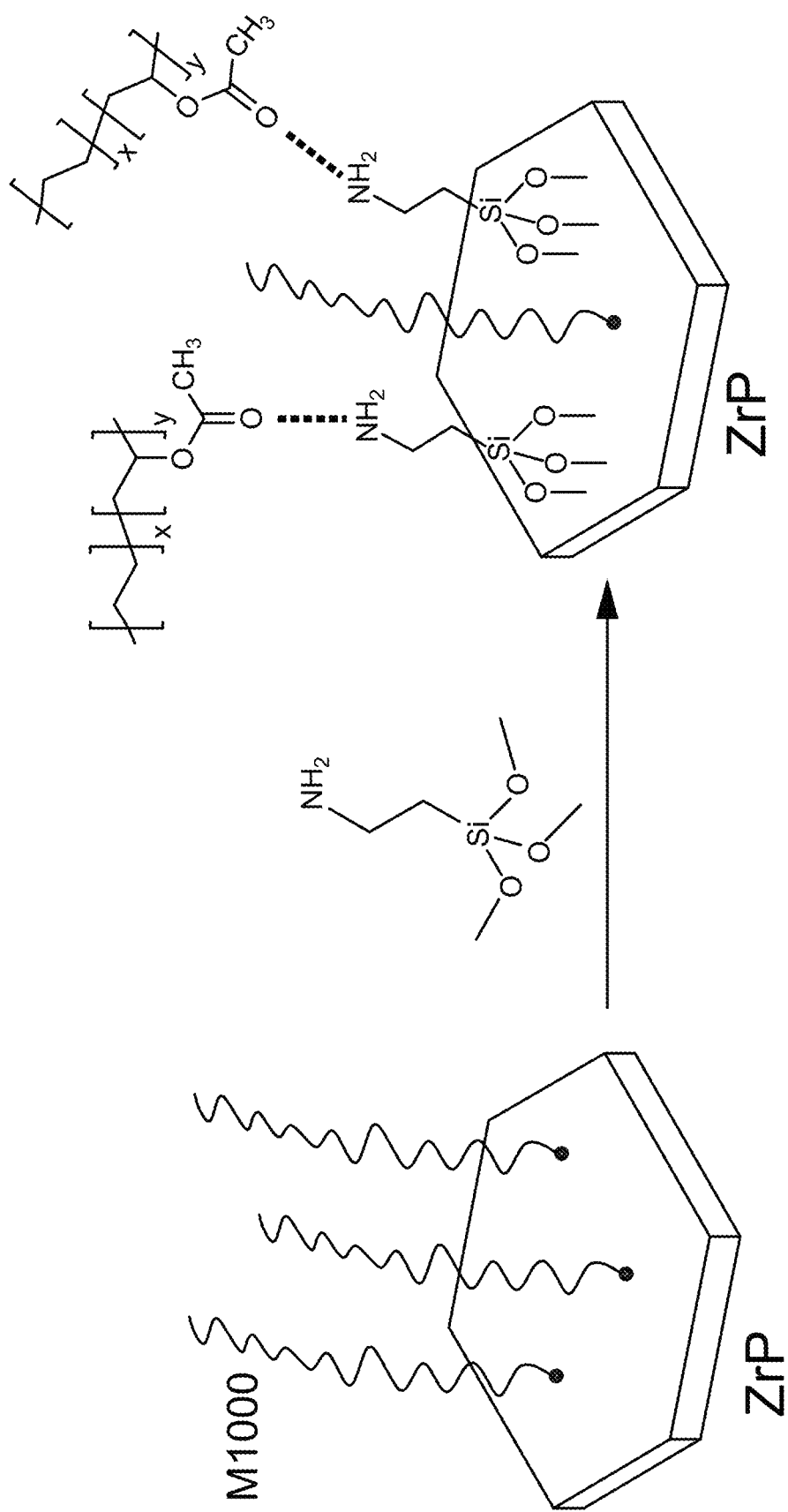
FIG. 2 is a schematic illustration of the interaction between PE-co-VAc with the free amine of the silane covalently coupled to the nanoplatelet for the nanocomposite shown in FIG. 1A.

Example 1 describes a procedure for preparing representative functionalized exfoliated nanoplatelets of the invention, PE-co-PVA/ZrP nanocomposites. FIG. 1A is a schematic illustration of the preparation of a representative nanoplatelet functionalized with an alkoxysilane having a free amine (APTMS). FIG. 1B is a schematic illustration of the preparation of a representative nanocomposite of the invention, PE-co-VAc/ZrP, from nanoplatelet functionalization with an alkoxysilane having a free amine (APTMS). FIG. 2 is a schematic illustration of the interaction between PE-co-VAc with the free amine of the silane covalently coupled to the nanoplatelet for the nanocomposite shown in FIG. 1A.

ZrP was functionalized from exfoliated state by secondary modifiers that provide interaction sites with polymer while maintaining ZrP exfoliation. APTMS grafts on the ZrP surface and partially replaces the surfactant (M1000). ZrP remains exfoliated after APTMS grafting (z-Avg=95 nm in THF and toluene). Assuming all APTMS has been grafted at the low ratio to the POH of 10%. Combining FTIR (fourier transform infrared) and TGA results, grafting ratio of APTMS and M1000 to the POH are 10% and 20%, respectively.

PE-co-VAc has various industrial applications; some requiring high melt strength, excellent tensile. However, it is well known to be a poor oxygen barrier. PE-co-VAc/α-ZrP nanocomposites improve PE-co-VAc mechanical and barrier properties. However, poor dispersion of α-ZrP in PE-co-VAc limits property enhancement. Exfoliated α-ZrP with amine functionalities generates hydrogen bonding with the acetate functional group on the PE-co-VAc that stabilizes α-ZrP exfoliation in PE-co-VAc matrix. PE-co-VAc mechanical properties are significantly improved by introducing exfoliated functionalized α-ZrP.

AFM (atomic force microscopy) and DLS confirmed the solvent effect on ZrP exfoliation in the PE-co-VAc copolymer. Amine functionality lead to increase in ZrP d-spacing as confirmed by WAXD and SAXS. TEM (transmission electron microscopy) confirmed exfoliated ZrP nanoplatelets in PE-co-VAc matrix.

Upon interaction between ZrP and polymer, polymer serves as a linker between ZrP platelets, which can lead to stacking of ZrP platelets (believed to be the large particles seen with DLS). The hydrogen bonding capability of solvents determines whether polymer can be coated on ZrP surface (non-polar solvents such as toluene provide for coating; polar solvents such as tetrahydrofuran (THF) prevent effective coating).

PE-co-VAc generates denser coating on ZrP (more hydrogen bonding sites) in toluene environment than THF. Densely coated PE-co-VAc on ZrP will not affect ZrP d-spacing after heating above the melting temperature of the nanocomposite.

Figure 3A:
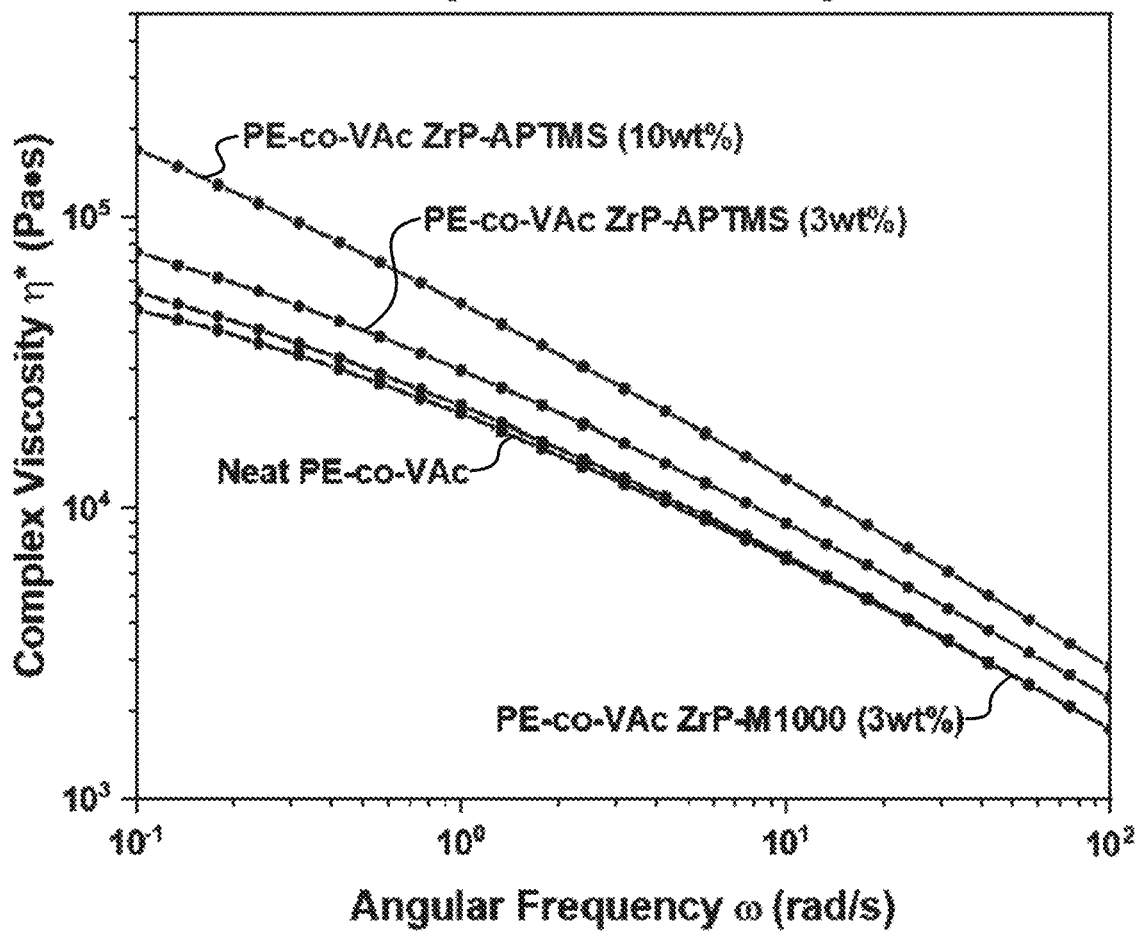
Figure 3B:
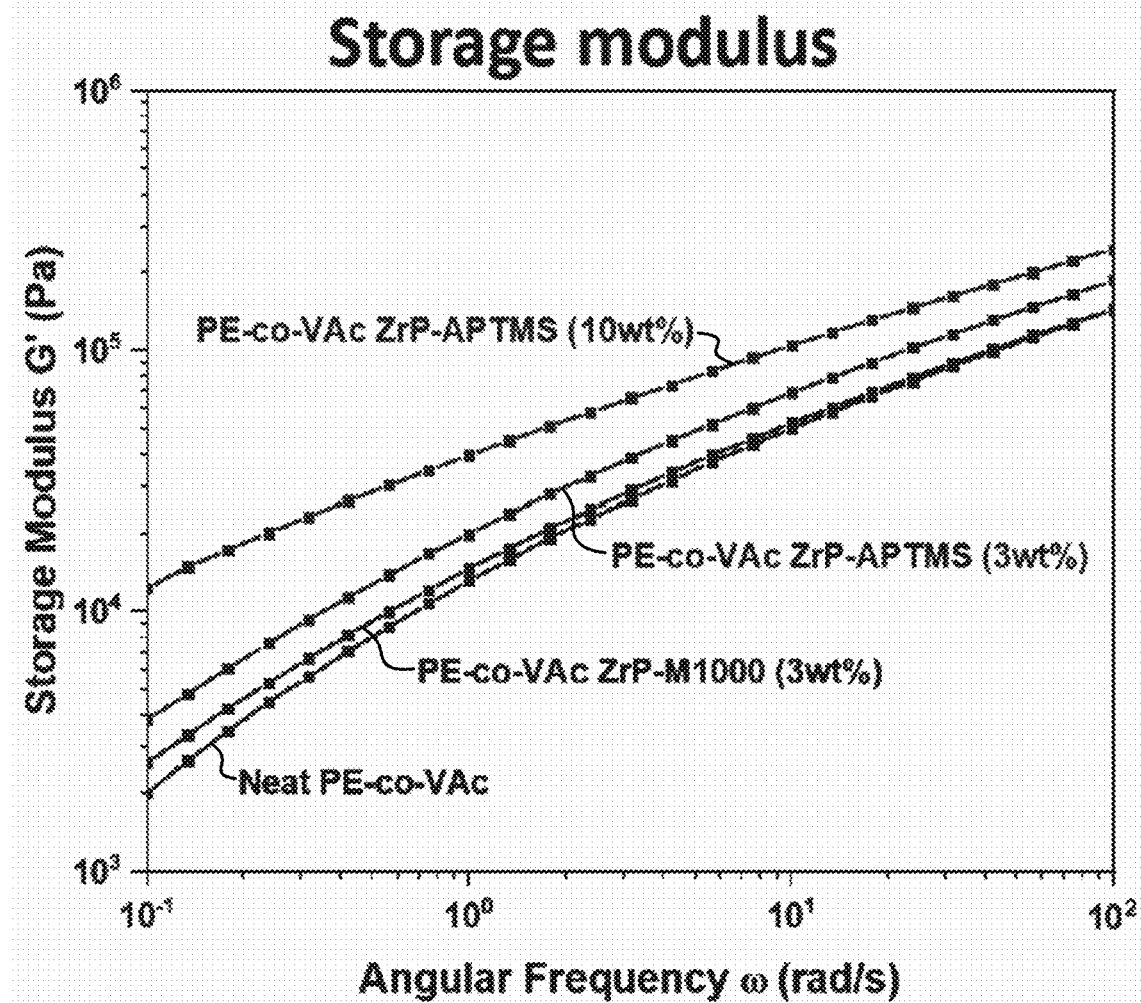
Figure 3C:
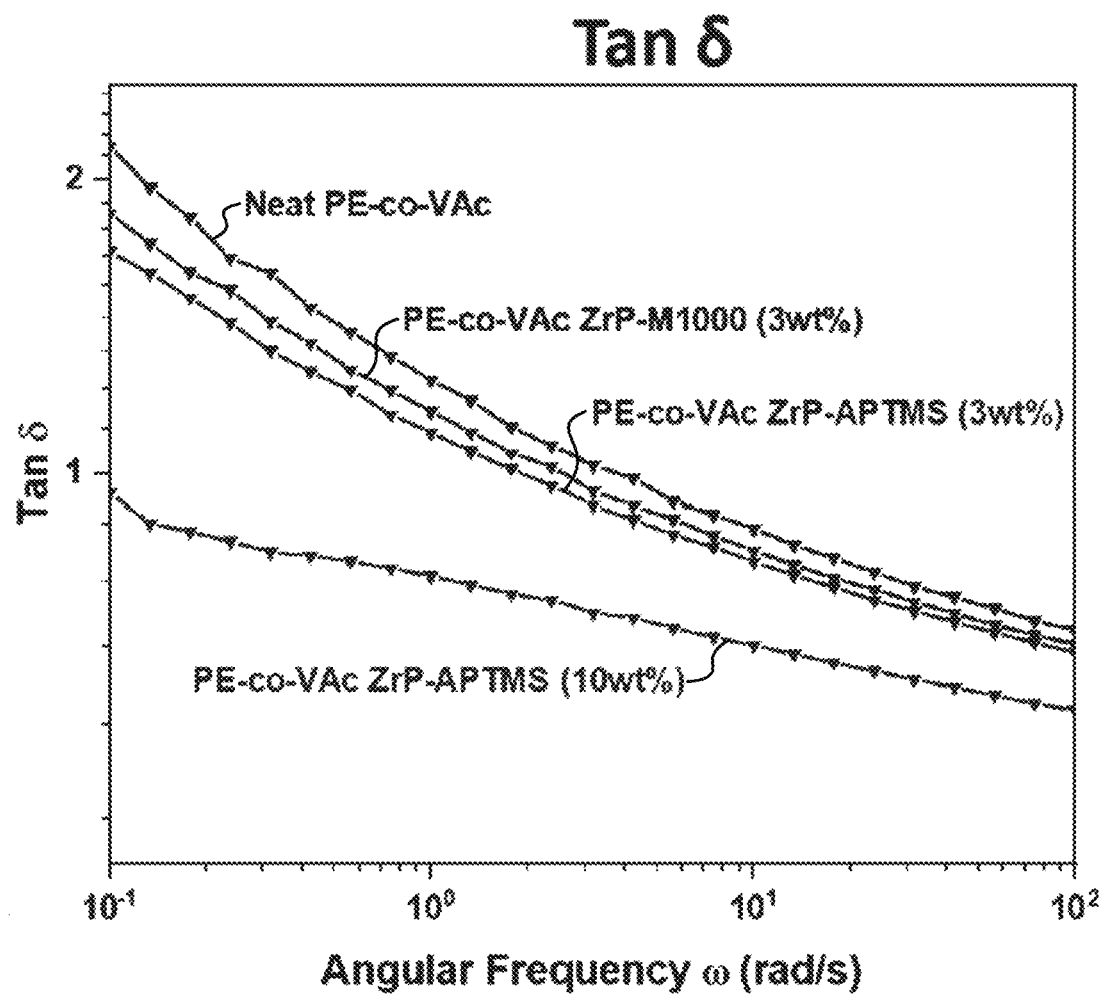

FIGS. 3A-3C compare of rheology properties [complex viscosity (3A), storage modulus (3B), and Tan δ (3C)] containing well-exfoliated ZrP (ZrP-APTMS) and intercalated ZrP (ZrP-M1000). Well-exfoliated ZrP and interaction between APTMS and polymer can significantly increase melt state viscosity and storage modulus. FIG. 3D tabulates the results.

Figure 4A:
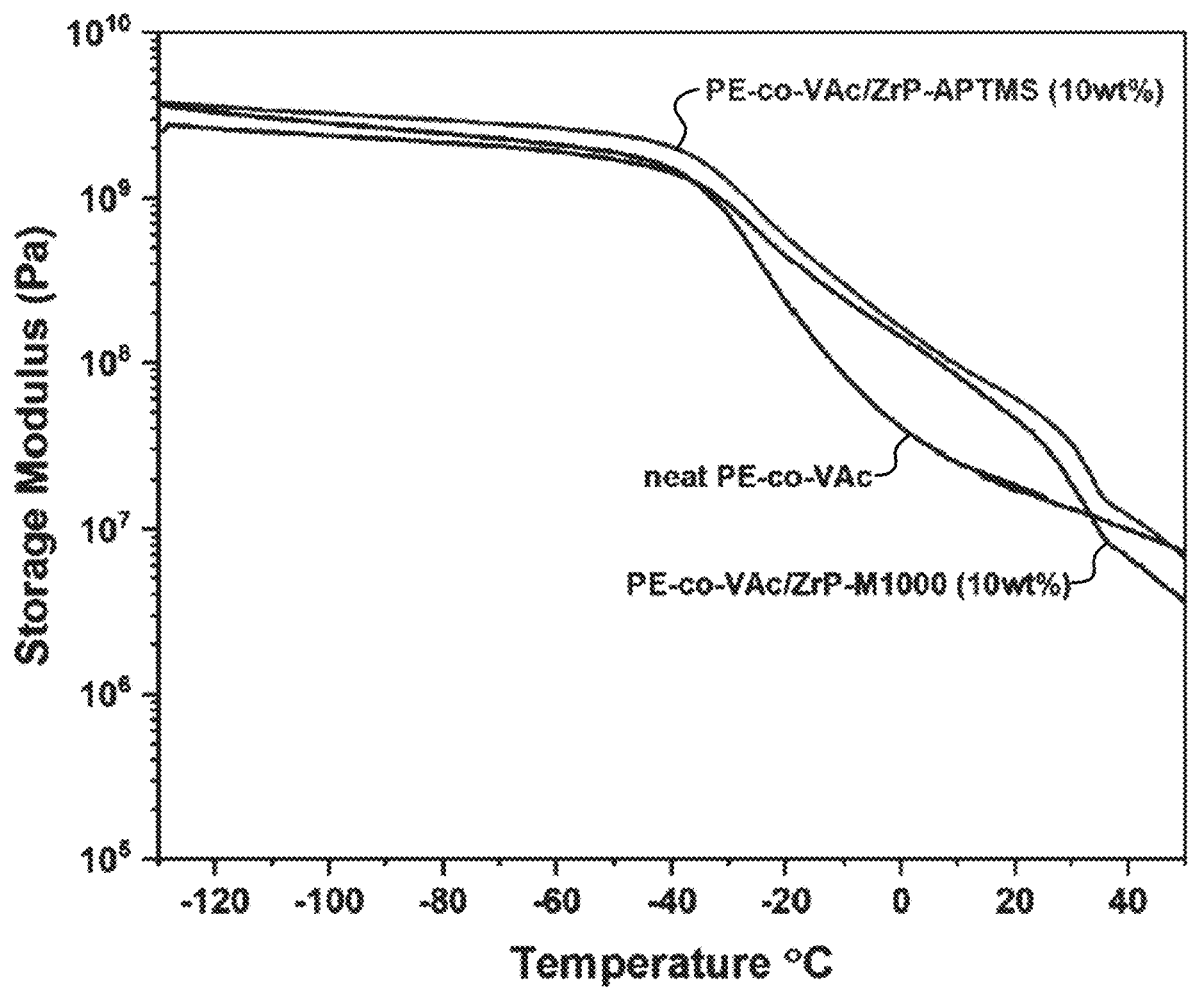
FIGS. 4A and 4B compare storage modulus (4A), and Tan δ (4B) at DMA for representative PE-co-VAc/ZrP nanocomposites of the invention.
Figure 4B:
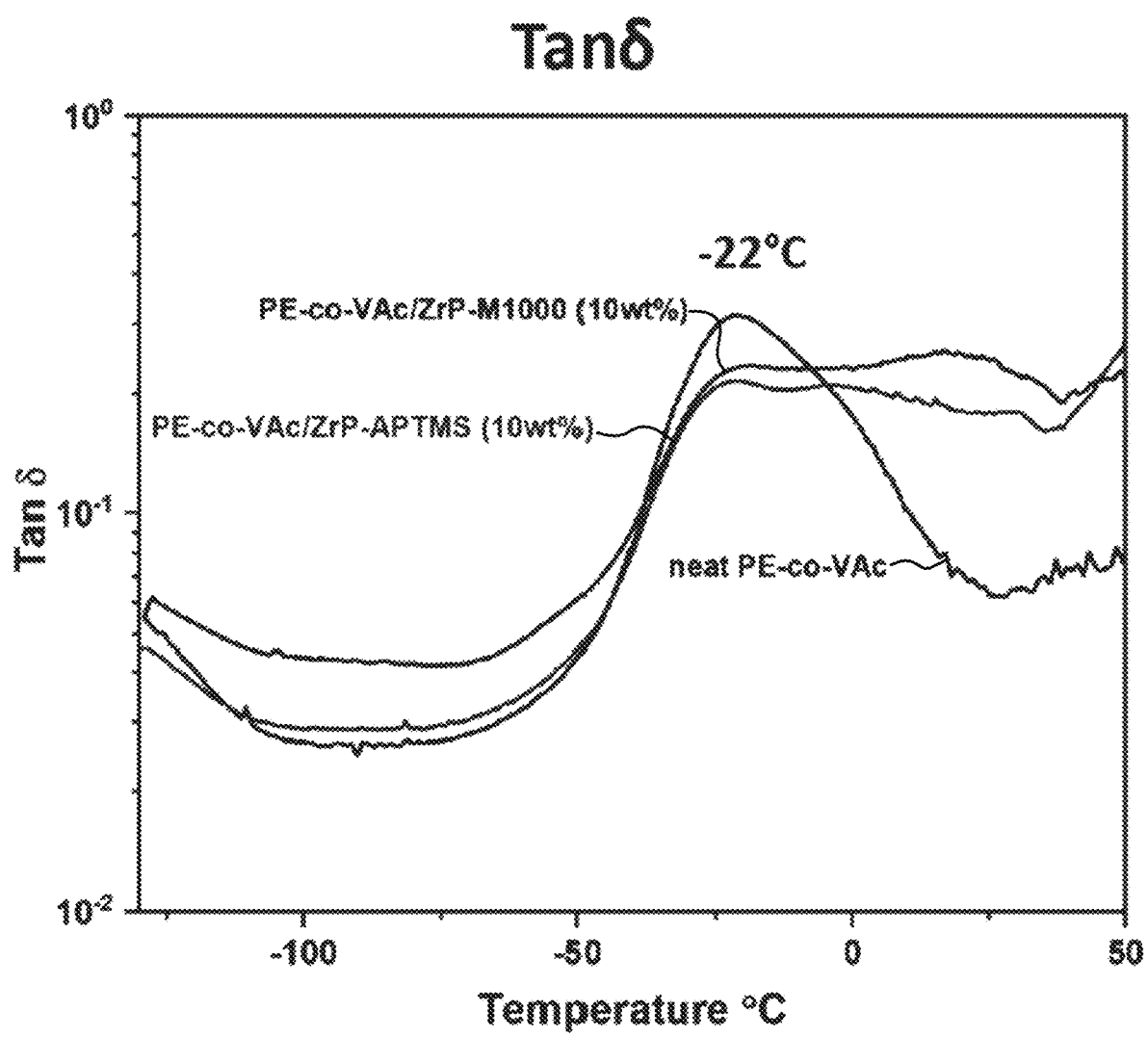

FIGS. 4A and 4B compare storage modulus (4A), and Tan δ (4B) at DMA for representative PE-co-VAc/ZrP nanocomposites of the invention. Exfoliated ZrP-APTMS increases G' compared to neat PE-co-VAc matrix. Poorly exfoliated ZrP-M1000 and free M1000 remaining in the system deteriorate G' and increase Tan δ.

Figure 5A:
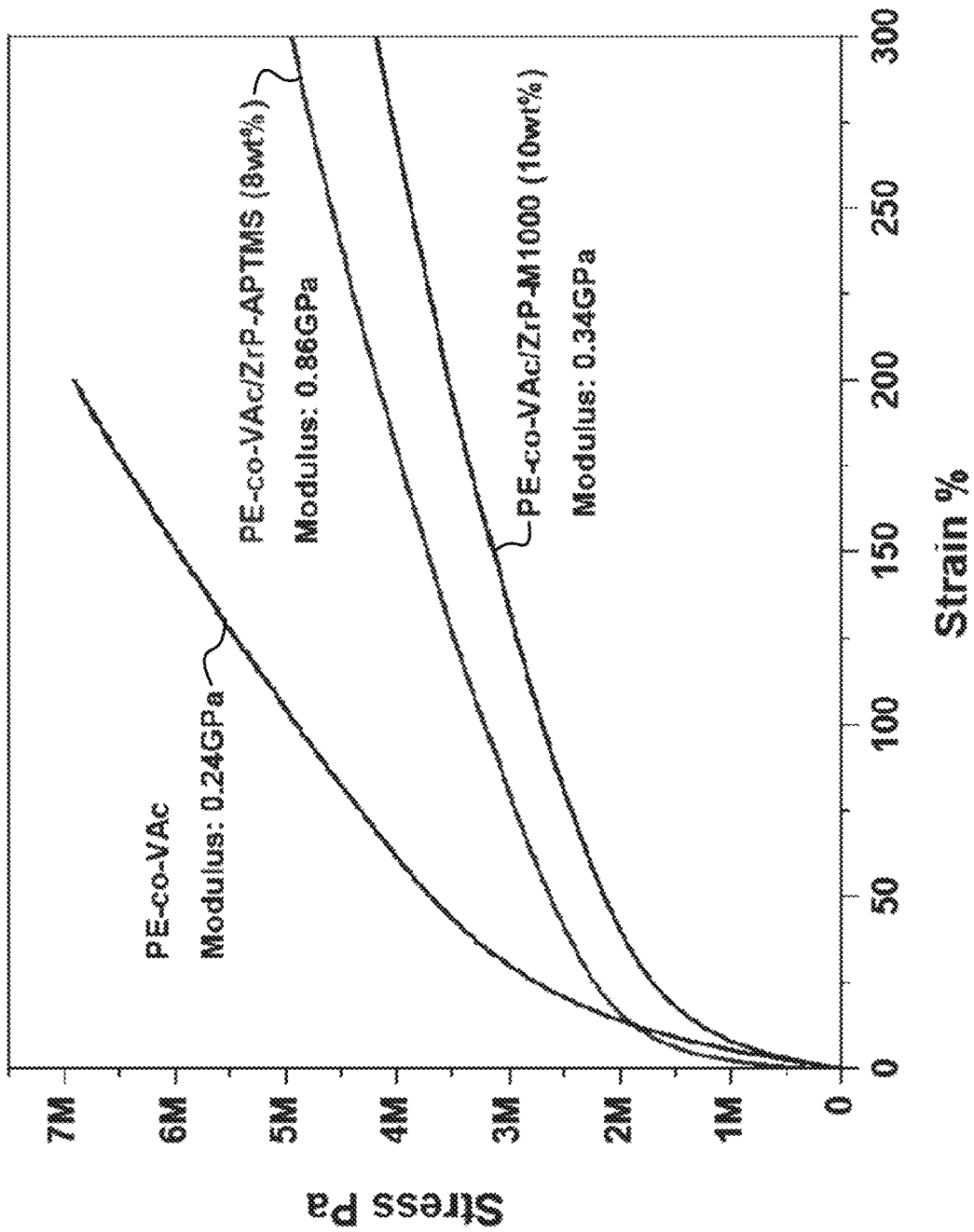
FIG. 5A compares tensile tests (Young's modulus and tensile strength) for representative PE-co-VAc/ZrP nanocomposites of the invention. Comparison of tensile properties containing well-exfoliated ZrP (ZrP-APTMS) and intercalated ZrP (ZrP-M1000).

FIG. 5A compares tensile tests for representative PE-co-VAc/ZrP nanocomposites of the invention. Comparison of tensile properties containing well-exfoliated ZrP (ZrP-APTMS) and intercalated ZrP (ZrP-M1000). Young's Modulus: well-exfoliated ZrP with high surface area and interaction with PE-co-VAc significantly increases Young's modulus. Intercalated ZrP in PE-co-VAc only slightly increases Young's modulus. Tensile strength: better dispersed and exfoliated ZrP in PE-co-VAc leads to higher tensile strength. FIG. 5B tabulates the results.

Figure 6A:
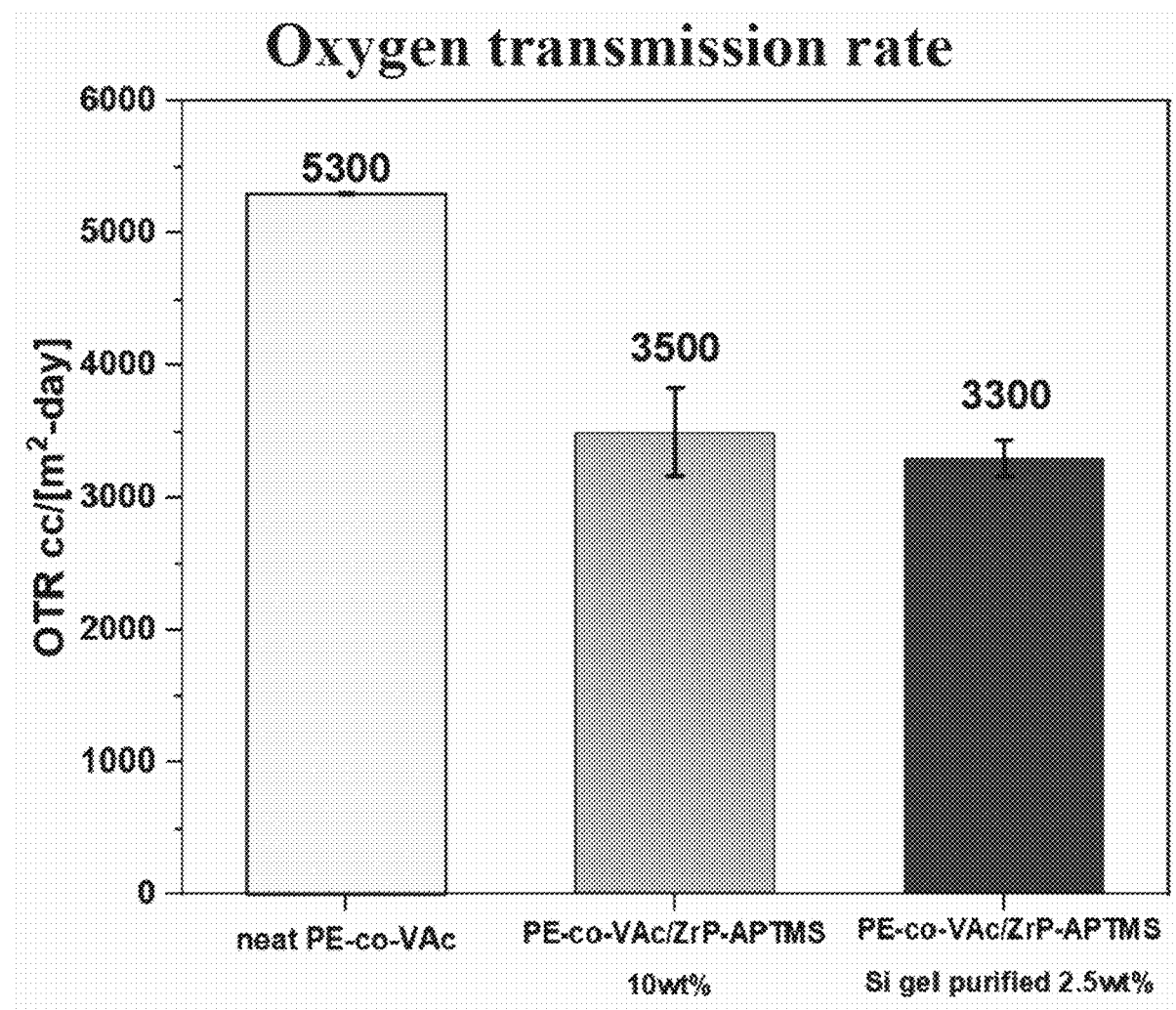
FIG. 6A compares barrier properties (oxygen transmission rate, OTR) of representative PE-co-VAc/ZrP nanocomposites.

FIG. 6A compares barrier properties (oxygen transmission rate, OTR) of representative PE-co-VAc/ZrP nanocomposites. PE-co-VAc has a poor barrier property against oxygen. OTR value of PE-co-VAc/ZrP nanocomposite is decreased by 30% after 10 wt. % of ZrP loading (with M1000). M1000-free ZrP enhances barrier property more effectively at 40% reduction after only 2.5 wt. % addition. FIG. 6B tabulates the results.

Example 2 describes the preparation of representative functionalized exfoliated nanoplatelets of the invention, exfoliated ZrP nanoplatelets functionalized with polyethylene (PE) by ring-opening metathesis (ROMP): PE/ZrP nanocomposites. The preparation is schematically illustrated in FIG. 7.

Figure 7:
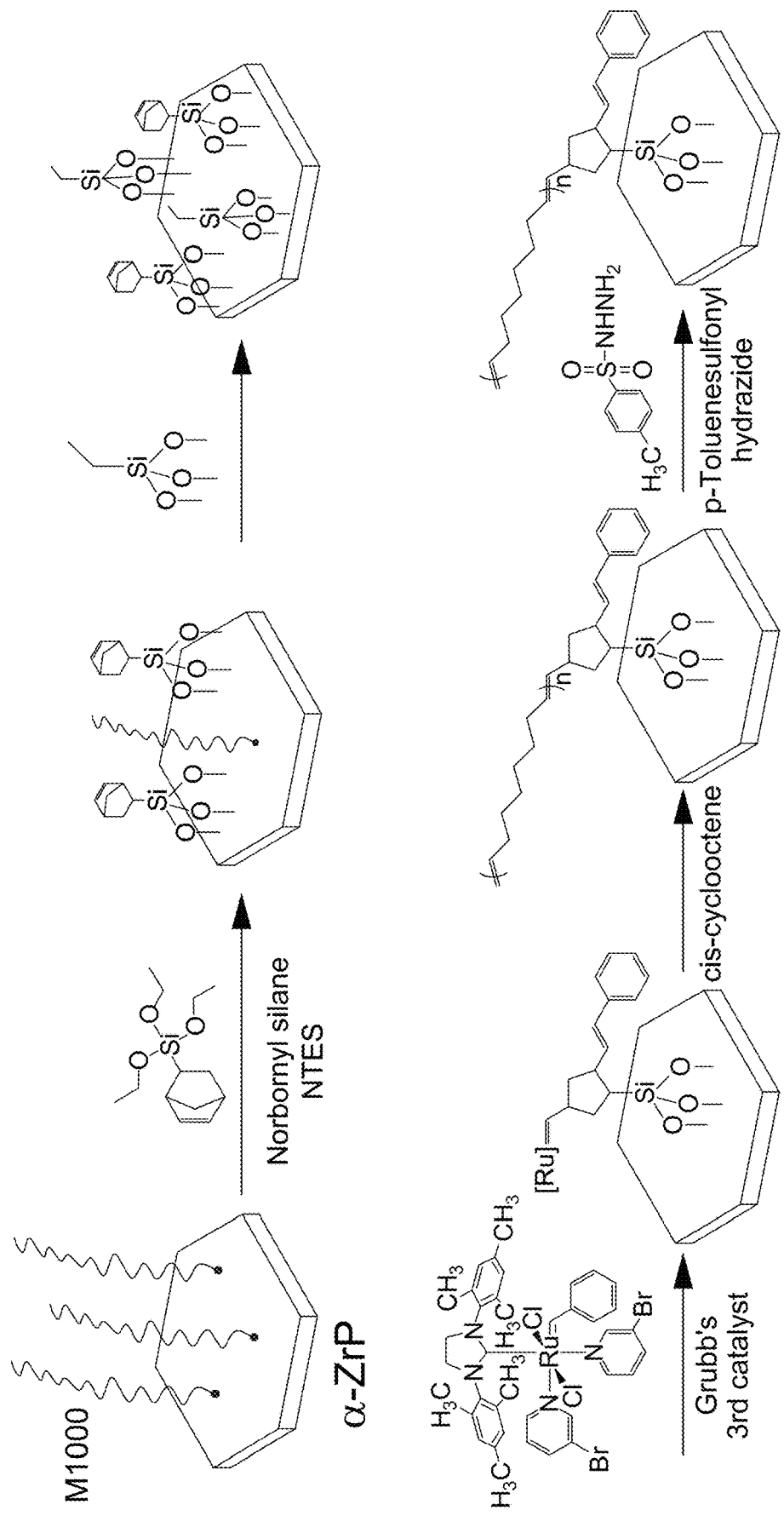
FIG. 7 is a schematic illustration of the preparation of representative functionalized exfoliated nanoplatelets of the invention, exfoliated ZrP nanoplatelets functionalized with polyethylene (PE) by ring-opening metathesis (ROMP): PE/ZrP nanocomposites.

FIG. 7 is a schematic illustration of the preparation of representative functionalized exfoliated nanoplatelets of the invention, exfoliated ZrP nanoplatelets functionalized with polyethylene (PE) by ring-opening metathesis (ROMP): PE/ZrP nanocomposites.

For ring-opening metathesis (ROMP), exfoliated ZrP nanoplatelets are functionalized with an alkene that is suitable for ROMP. In certain embodiments, the alkene is a vinyl group that is covalently coupled to the nanoplatelet by reaction of the nanoplatelet with a vinyl silane (e.g., vinyl trimethoxysilane, VTMS). The functionalized nanoplatelet is then subject to ROMP using a cycloolefin, such as cyclooctene, using a Grubb's catalyst. The result is exfoliated ZrP nanoplatelets functionalized with polyethylene (PE): PE/ZrP nanocomposites.

FIG. 7 illustrates ZrP-NTES surface-initiated ROMP from ZrP-NTES-ETMS.

Norbornyl silane (e.g., NTES) provides the benefit of using a norbornyl group rather than a simple alkene group (e.g., vinyl) related to the relief of ring strain after the catalyst reacts with the norbornene moiety generates an essentially irreversible tether. Polycyclooctene (PCO) grafting density can be alternated by NTES grafting ratio.

Referring to FIG. 7, NTES is reacted with ZrP and then further reacted with ethyl trimethoxysilane (ETMS). In the two-step reaction, NTES is grafted on then ZrP surface followed by addition of ETMS at higher temperature to remove M1000 and keep ZrP exfoliated. Silanization was confirmed by FTIR and TGA. NTES reacted at relative low temperature and its low grafting ratio did not effectively remove M1000. By introducing ETMS at elevated temperature, M1000 was effectively removed, which can eliminate the yellowing previously seen at high temperatures and improve mechanical properties. ZrP-NTES-ETMS remains exfoliated in THF or xylene.

The silane-modified ZrP was then subject to surface-initiated ROMP (Grubb's $3^{rd}$ catalyst followed by cyclooctene and hydrogenation). After ROMP, solution was first passed through $Al_2O_3$ column to remove the catalyst. Then, methanol was used to separate unreacted ZrP and low MW PCO from PCO-grafted ZrP. ROMP at 10 and 15 wt % loading, ZrP remains exfoliated in THF before and after ROMP. After ROMP, lyotropic PCO/ZrP (15 wt %) liquid crystals were observed under cross-polarized light.

FTIR confirmed the PCO grafting on ZrP surface. ZrP induced ROMP from its surface and edges. ZrP remains exfoliated and PCO grows preferentially on ZrP edges. After hydrogenation, PCO-grafted ZrP was converted into PE-grafted ZrP.

Example 3 describes the preparation of representative functionalized exfoliated nanoplatelets of the invention, exfoliated ZrP nanoplatelets functionalized with high density polyethylene (HDPE): HDPE/ZrP nanocomposites.

In certain embodiments, following PCO/ZrP hydrogenation, PE/ZrP nanocomposites can be direct mixed with neat HDPE. HDPE has various industrial applications but has a high oxygen transmission rate; increasing its barrier property can extend HDPE applications. α-ZrP is a synthetic 2D layered material that can be readily exfoliated and modified with desired functionalities. PE/α-ZrP nanocomposites are shown herein to improve HDPE mechanical and barrier properties. However, poor dispersion of α-ZrP in HDPE limits property enhancement. Exfoliated α-ZrP with surface grafted PE can improve ZrP miscibility in HDPE matrix and induce co-crystallization between neat HDPE and grafted PE. As shown herein, PE mechanical properties are significantly improved by introducing and stabilizing exfoliated α-ZrP.

PCO can be hydrogenated into HDPE by noncatalytic hydrogenation. Grafted PE and neat HDPE can co-crystallized. PCO with higher MW has higher crystallization and melting temperature. Longer polymer chain can better co-crystallize with neat HDPE and does not affect the crystallinity.

Figure 8A:
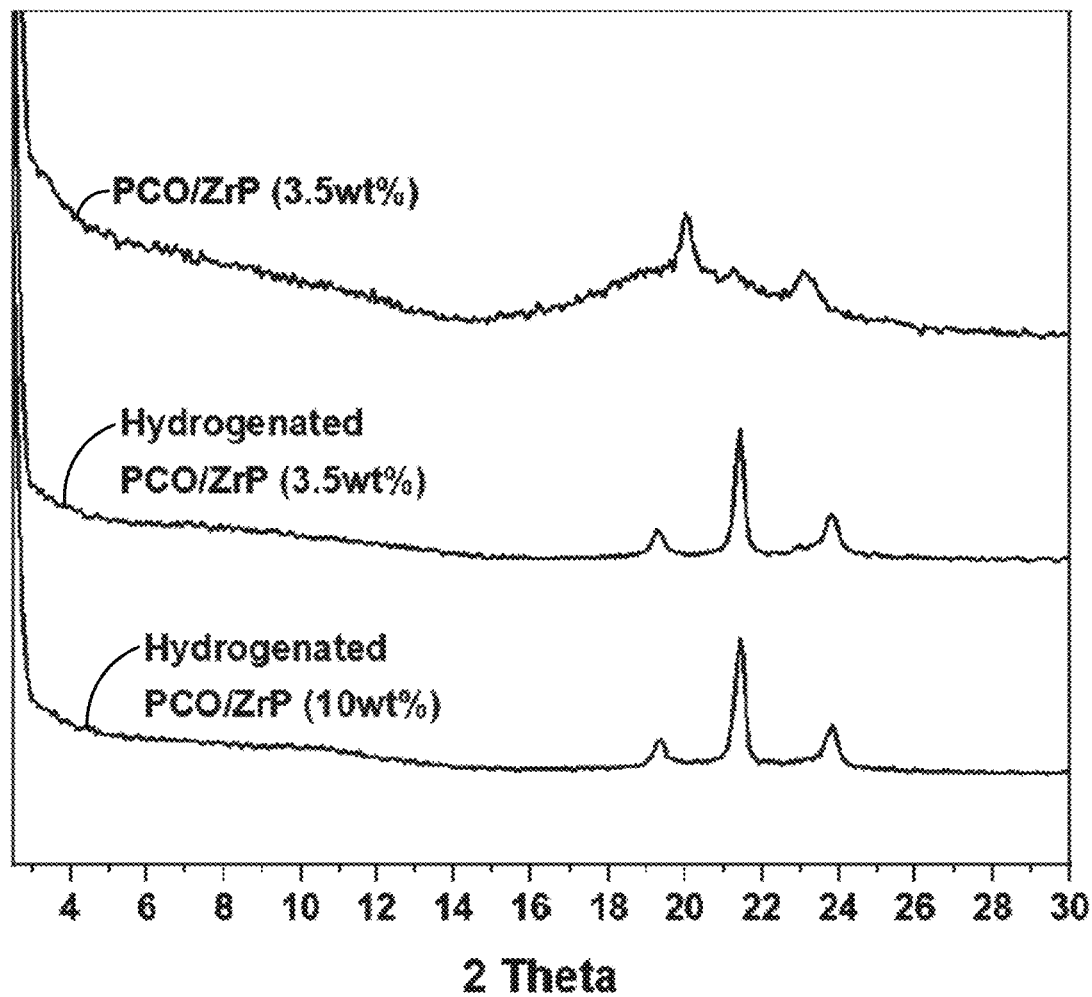
FIGS. 8A and 8B compare WAXD (wide-angle x-ray diffraction) of ZrP SI-ROMP (as-synthesized and hydrogenated PCO/ZrP) (8A) and direct mix with HDPE 9003 (8B).
Figure 8B:
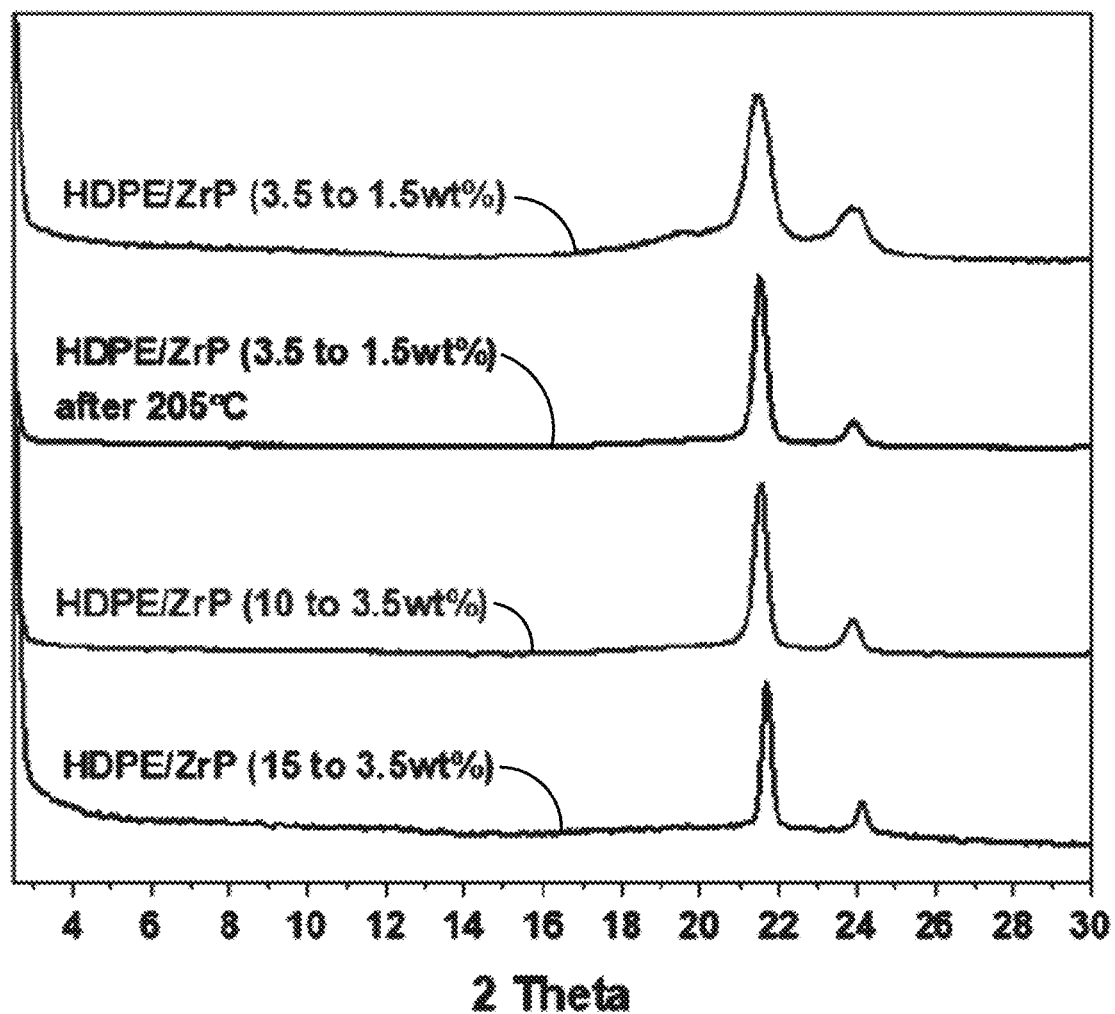

FIGS. 8A and 8B compare WAXD of ZrP SI-ROMP (as-synthesized and hydrogenated PCO/ZrP) (8A) and direct mix with HDPE 9003 (8B).

PCO grafted ZrP after hydrogenation did not form detectable stacking structure in HDPE 9003. Monoclinic PE crystalline structure was observed. After rheology measurement at 205° C., ZrP did not re-aggregate.

Figure 9A:
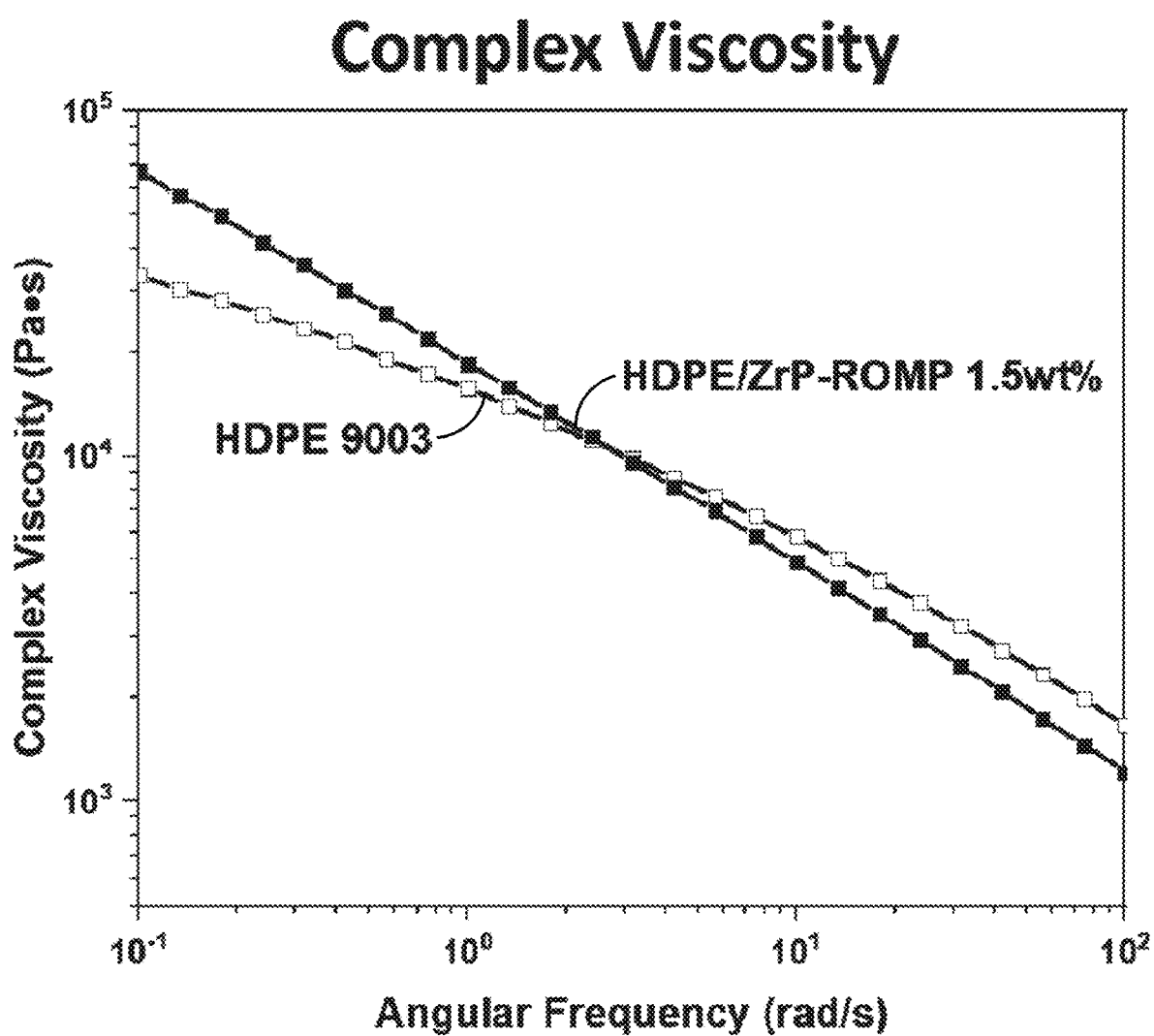
FIGS. 9A-9C compare rheological behavior of HDPE 9003 and HDPE/ZrP nanocomposites: complex viscosity (9A), storage modulus (9B), and Tan δ (9C).
Figure 9B:
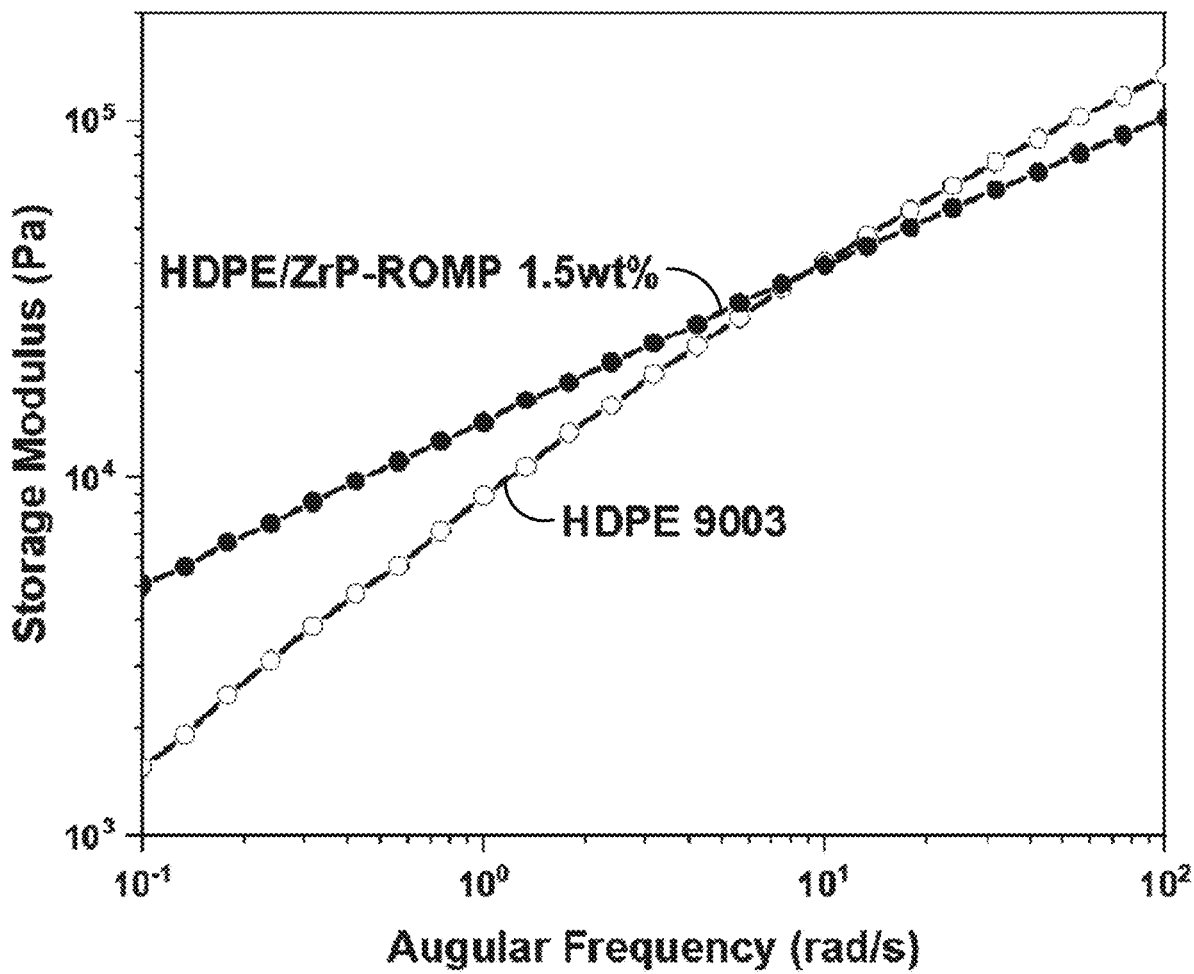
Figure 9C:
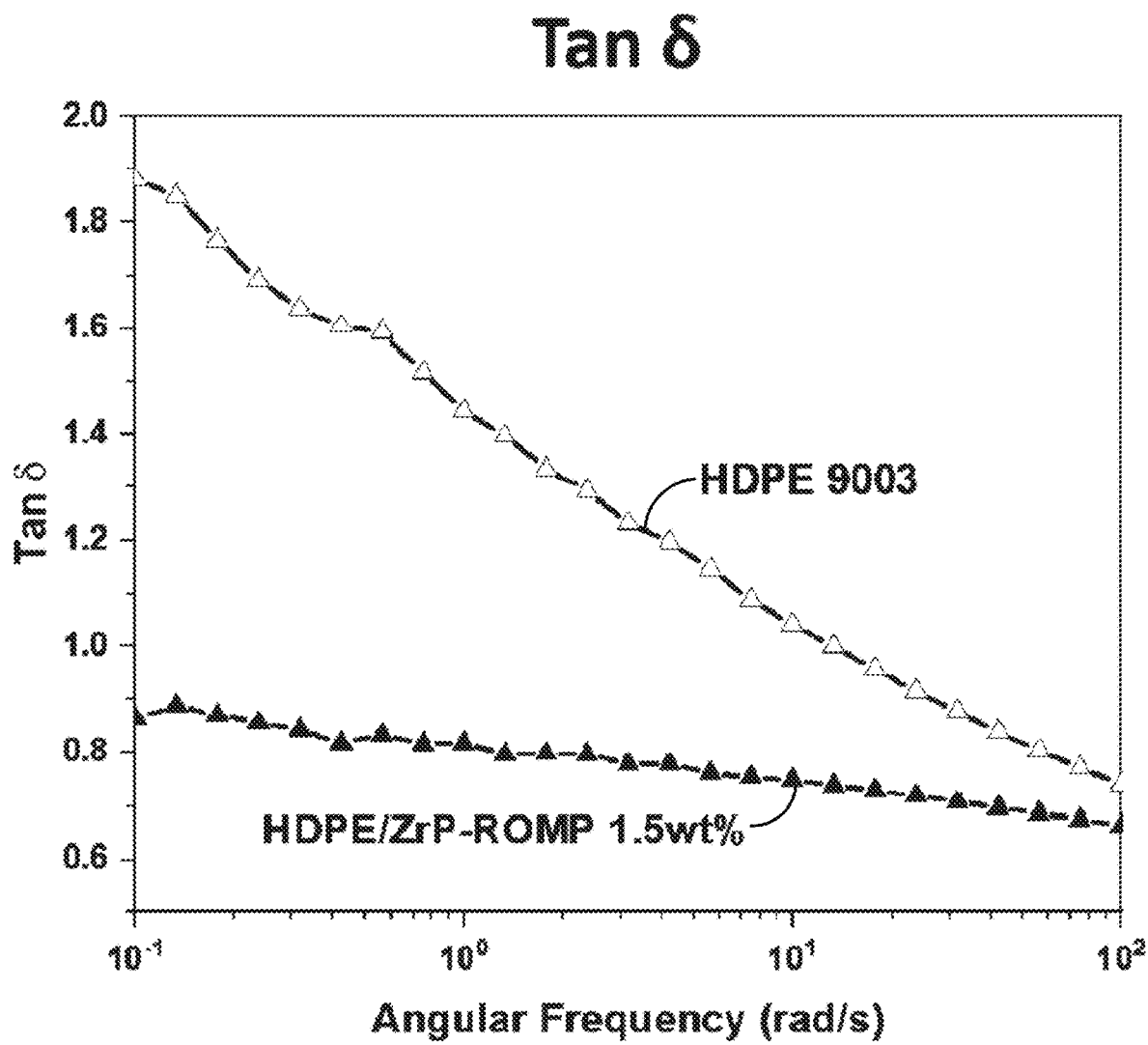

FIGS. 9A-9C compare rheological behavior of HDPE 9003 and HDPE/ZrP nanocomposites: complex viscosity (9A), storage modulus (9B), and Tan δ (9C). Rheology behavior at low frequency: ZrP significantly increased HDPE viscosity and storage modulus at 1.5 wt % loading. Rheology behavior at high frequency: HDPE/ZrP nanocomposites viscosity and storage modulus decreased to lower then HDPE believed to be from the presence of M1000. Introducing ZrP in HDPE leads to lower tan δ value at frequency 0.1-100 rad/s.

FIG. 10 compares PE nanocomposites rheological properties. In FIG. 10, "HDPE/ZrP-ROMP" refers to a representative HDPE/ZrP nanocomposite of the invention. As shown in FIG. 10, compared to the recently reported HDPE nanocomposites melt strength studies, PE/ZrP (via ROMP) having large aspect ratio and potentially good exfoliation and dispersion can significantly increase composites melt viscosity and storage modulus at low ZrP weight fraction.

Example 4 describes the preparation of representative functionalized exfoliated nanoplatelets of the invention, exfoliated ZrP nanoplatelets functionalized with polycyclooctene (PCO) by ring-opening metathesis (ROMP): PCO/ZrP nanocomposites.

As used herein, the term "about" refers to ±5% of the specified value.

The following examples are provided for the purpose of illustrating, not limiting, the invention.

EXAMPLES

Example 1

Preparation of Representative Functionalized Exfoliated Nanoplatelets: PE-Co-PVA/ZrP Nanocomposites This example describes the preparation of representative functionalized exfoliated nanoplatelets of the invention, exfoliated ZrP nanoplatelets functionalized with a copolymer (PE-co-PVA): PE-co-PVA/ZrP nanocomposites. The preparation is schematically illustrated in FIG. 1B.

Step 1 (exfoliation). ZrP was prepared according to a published procedure (H.-J. Sue, J. Mater. Chem. A., 2015, 3, 2669-2676). The exfoliation of ZrP was carried out using JEFFAMINE® M1000 (a copolymer of ethylene oxide and propylene oxide with an amine group at one end only). For dispersion, 6 g of ZrP mixed with 210 ml of acetone in a 500 ml round bottom flask and sonicated for 30 minutes. A JEFFAMINE® M1000 solution in acetone (0.6 g/ml) was added (33 mL) dropwise to the stirring ZrP mixture. This dispersion was allowed to stir for 12 h. The dispersion was sonicated for 60 min followed by centrifugation at 10,000 rpm for 30 min. The sediment was removed leaving a clear suspension containing exfoliated ZrP-M1000 and excess JEFFAMINE® M1000. The excess JEFFAMINE® M1000 was removed using dialysis in acetone. IR (cm-1): 2866 broad (C—H). TGA (air) mass loss 190-420° C., 51.33 wt %.

Preparation of ZrP-M1000-APTMS. A portion of ZrP-M1000 (ZrP 30 mg), prepared as described above, was re-dispersed in 20 mL THF. The ZrP solution was warmed in a 60° C. oil bath. A 0.7 mg/mL solution of (3-aminopropyl)trimethoxysilane (APTMS) in THF was prepared. A volume of 5 mL of APTMS solution (20 mol % to ZrP) was added dropwise into the ZrP solution. The solution was allowed to stir overnight. The as-synthesized ZrP-APTMS was purified by adding hexane and collect the sediment in centrifuge at 3000 rpm for 2 minutes. The purified ZrP-APTMS sediment was re-dispersed into 20 mL toluene.

Preparation of polyethylene-co-polyvinyl acetate (PE-co-VAc)/ZrP nanocomposite. To prepare PE-co-VAc/ZrP nanocomposites at 10 wt % of ZrP, a solution mixing method was applied. The purified ZrP-APTMS solution in toluene, prepared from ZrP-APTMS as described above, was stirred and pre-heated at 80° C. in an oil bath. PE-co-VAc pellets (0.27 g) were dissolved in 10 mL of toluene at 80° C. and the solution was added dropwise into the ZrP-APTMS solution while stirring. The mixture was stirred for 1 hour. Solvent was removed by rotary evaporator to give a transparent gel which was dried in a vacuum oven. The PE-co-VAc/ZrP nanocomposite (10 wt %) was formed into a film using a hot press at 100° C. and 1200 kg. AFM of diluted PE-co-VAc/ZrP solution showed polymer immobilized on exfoliated ZrP surface (ZrP-APTMS thickness 2 nm, PE-co-VAc/ZrP-APTMS 20 wt % thickness 10 nm). DLS (correlation coefficient) corresponded with AFM results. WAXD and SAXS showed the d-spacing of ZrP in PE-co-VAc matrix was 6 nm at ZrP 10 wt %. TEM and OM (optical microscopy) confirmed the good dispersion and exfoliation of ZrP in PE-co-VAc at 10 wt %. Introducing exfoliated ZrP in PE-co-VAc significantly increased polymer melt strength, Young's modulus, and slightly decreased the polymer crystallinity. Crystallinity of PE-co-VAc/ZrP nanocomposites slightly decreased from 9% (neat PE-co-VAc) to 7% at 10 wt % ZrP loading. Compared to neat PE-co-VAc, PE-co-VAc/ZrP nanocomposites viscosity (100° C., 0.1 rad/s) increased to 1.6 and 3.6 times at 3 wt % and 10 wt %, respectively. Storage modulus at the same condition increased 2 and 6 times at 3 wt % and 10 wt %, respectively. Tan δ significantly decreased with the introduction of exfoliated ZrP. DMA test from −135° C. to 50° C. showed an increase in storage modulus and a good damping behavior around room temperature. Young's modulus increased 3.6 times with respect to neat PE-co-VAc at 10 wt % ZrP loading.

Example 2

Preparation of Representative Functionalized Exfoliated Nanoplatelets: PE/ZrP Nanocomposites This example describes the preparation of representative functionalized exfoliated nanoplatelets of the invention, exfoliated ZrP nanoplatelets functionalized with polyethylene (PE) by ring-opening metathesis (ROMP): PE/ZrP nanocomposites. The preparation is schematically illustrated in FIG. 7.

ZrP-NTES-ETMS preparation. A portion of the ZrP-M1000 (ZrP 30 mg), prepared as described above, was concentrated to a gel in a rotary evaporator and re-dispersed in 20 mL xylene. The ZrP-M1000 solution was then warmed to 60° C. in an oil bath. Norbornyl silane, (5-bicyclo[2.2.1]hept-2-enyl)triethoxysilane (NTES) was used to functionalize ZrP. A 15 mg/mL solution of NTES in xylene was prepared. This solution (3.4 mL, 2:1 mol ratio NTES:ZrP) was added to the ZrP-M1000 solution and was stirred overnight. The as-synthesized ZrP-NTES solution was further reacted with ethyl trimethoxylsilane (ETMS, 3:1 mol ratio vs ZrP) at 100° C. in xylene for 24 hours to remove the JEFFAMINE® M1000 surfactant. The resultant ZrP-NTES-ETMS was first purified by adding hexane and the ZrP sediment was isolated using a centrifuge (3000 rpm). This purification step was repeated 3 times to remove non-grafted NTES and ETMS. Silica gel was introduced to further remove free JEFFAMINE® M1000. The upper solution was collected and centrifuged for 10 min (10,000 rpm) to remove both the remaining silica and non-exfoliated ZrP. Finally, THF was added to the ZrP-NTES-ETMS until a concentration of 1.5 mg/mL was reached.

DLS (Z avg) of purified ZrP-NTES-ETMS is 95 nm in THF. TGA ($N_2$) mass loss from 300-450° C., 42 wt %.

ZrP surface-initiated Ring-Opening Metathesis Polymerization (SI-ROMP). Cyclooctene was first passed through alumina columns to remove stabilizers before use. Grubb's 3rd generation olefin ring-opening metathesis catalyst (dichloro[1,3-bis(2,4,6-trimethylphenyl)-2-imidazolidinylidene](benzylidene)bis(3-bromopyridine)ruthenium(II)) was used as received. The entire process was performed under a nitrogen atmosphere. A Schlenk flask was first degassed and filled with nitrogen. ZrP-NTES-ETMS (30 mg ZrP), prepared as described above, in THF solution was added, and 8.5 mg of the ruthenium catalyst was added in 0.5 mL THF. The solution was stirred for 20 min. Cyclooctene (0.12 g) was dissolved in 0.5 mL THF and freeze-pump-thaw was used to remove oxygen. After the dropwise addition of cyclooctene the resulting solution was stirred at room temperature for 120 minutes. Then 0.2 mL of ethyl vinyl ether was added to the reaction to quench the ROMP with stirring for 30 min. The as-synthesized ZrP-polycyclooctene (PCO) solution was passed through an alumina column to remove the catalyst. The solution was then concentrated and the ZrP was washed with methanol to remove non-reacted cyclooctene and possible oligomers. The PCO grafted ZrP was exfoliated after redispersing in THF, with a hydrodynamic size of 95 nm measured by DLS. The FTIR revealed strong peaks at 2921 $cm^{-1}$ (C—H), 2845 $cm^{-1}$ (C—H) and no intercalation peaks from 2-10° in WAXD. [110] and [201] PCO crystalline peaks can be observed at 2θ=20.1° and 23.9°. Melting and crystallization temperatures were 60° C. and 40° C., respectively based on DSC results with a temperature ramp of 10° C./min.

Conversion of PCO-grafted ZrP into polyethylene-grafted ZrP. A 250 mL 3-neck flask Schlenk flask was first degassed and filled with nitrogen using a Schlenk line. The PCO/ZrP (30 mg ZrP), prepared as described above, was dissolved into 30 mL xylene then transferred into the Schlenk flask along with p-toluenesulfonyl hydrazide (0.2 g, 1 eq. with respect to the olefin in the polymer). The flask was equipped with a reflux condenser, a rubber stopper and the other neck was connected to nitrogen. A syringe was used to transfer the PCO/ZrP solution into the flask which was then heated in a 135° C. oil bath. Then, 0.2 g tributylamine (1 eq. to polymer) was introduced to the stirring solution dropwise via a syringe. This mixture was heated and stirred for 6 hours, then allowed to cool. The product (polyethylene-grafted ZrP) was precipitated into methanol. The sediment was collected by centrifuge at 5000 rpm. The solid product was then washed three times with methanol.

The crystallization temperature and melting temperature were 112° C. and 132° C., respectively, based on DSC results with a temperature ramp of 10° C./min. ZrP with covalently-bound hydrogenated PCO did co-crystallize with neat HDPE. ZrP remained exfoliated after hydrogenation and PE [110] and [200] crystalline peaks were observed in WAXD at 2θ=21.5° and 23.9°.

Example 3

Preparation of Representative Functionalized Exfoliated Nanoplatelets: HDPE/ZrP Nanocomposites This example describes the preparation of representative functionalized exfoliated nanoplatelets of the invention, exfoliated ZrP nanoplatelets functionalized with high density polyethylene (HDPE): HDPE/ZrP nanocomposites.

Direct mix HDPE grafted ZrP with neat HDPE. To prepare HDPE/ZrP nanocomposites with 5 wt % ZrP, a solution mixing method was applied. Commercially available HDPE (0.45 g, Mn 10,000 Daltons, polydispersity index of 15 from *Formosa* Plastics) was dissolved in 30 mL xylene at 120° C. for 30 min. Polyethylene-grafted ZrP (ZrP 30 mg), prepared as described in Example 2 (the polyethylene grafted ZrP prepared as described in Example 2 was further diluted in neat HDPE), was dissolved in 20 mL xylene at 120° C. for 30 min. A glass pipet was used to transfer the hot HDPE solution into the PE/ZrP solution with stirring. The mixture was heated and stirred for 1 hour. The solution was dried at 60° C. overnight and then further dried at 120° C. in a vacuum oven. The product, a HDPE/ZrP nanocomposite, was then hot-pressed into a film.

No ZrP intercalation peaks appeared in WAXD. Crystallinity of the PE/ZrP nanocomposites is 77% at 1.5 wt % ZrP loading, with respect to 78% of the neat HDPE. The viscosity of the composite as measured at 205° C. and 0.1 rad/s was 67 kPa vs 33 kPa for the starting HDPE. The storage modulus increased under the same conditions was 5.0 kPa, vs 1.5 kPa for the starting HDPE.

Example 4

Preparation of Representative Functionalized Exfoliated Nanoplatelets: PCO/ZrP Nanocomposites This example describes the preparation of representative functionalized exfoliated nanoplatelets of the invention, exfoliated ZrP nanoplatelets functionalized with polycyclooctene (PCO) by ring-opening metathesis (ROMP): PCO/ZrP nanocomposites.

ZrP functionalization procedure (0.5 g ZrP, 10 mol % norbornyl grafting). A suspension of 16.7 mL ZrP-M1000 in acetone (ZrP concentration: 30 mg/mL in acetone) was added to a round bottom flask and the acetone was removed using rotary evaporator. The solid was then suspended in 80 mL xylene. This suspension was heated to 80° C. in an oil bath under a nitrogen atmosphere to prevent ZrP aggregation caused by M1000 oxidation.

To a vial was added 40 mg of 5-bicyclo[2.2.1]hept-2-enyl)ethyl trimethoxysilane (NTMS) and 2 mL xylene. This solution was added to the suspension of ZrP-M1000 and allowed to react for 24 hours.

A solution of 6.25 g octadecyl trimethoxysilane (ODMS) in 5 mL xylene was prepared. This solution was added dropwise using a syringe to the ZrP-M1000-NTMS suspension. Heating was continued for 24 hours. ODMS grafting introduces the long alkyl chain on ZrP surface to increase ZrP hydrophobicity and prevent ZrP aggregation after subsequent catalyst immobilization.

A solution of 5 g ethyl trimethoxysilane (ETMS) in 5 mL xylene was added to the ZrP-M1000-NTMS-ODMS solution, and the reaction temperature was increased to 110° C. and react in air for 24 hours to fully remove the ZrP bound M1000. This solution was allowed to cool, and 5 g silica gel was added to fully absorb free M1000. After the silica gel fully settled down, the upper ZrP solution was collected and then precipitated in excess hexane and centrifuge at 5000 rpm for 5 minutes then re-dissolve in THF. The hexane purification is repeated 3 times to remove the unreacted silanes.

ZrP SI-ROMP procedure (30 mg ZrP, graft density 10 mol %, MW=50,000 g/mol). Grubb's $3^{rd}$ catalyst (dichloro[1,3-bis(2,4,6-trimethylphenyl)-2-imidazolidinylidene](benzylidene)bis(3-bromopyridine) ruthenium (II)) (1 molar equiv. to the NTMS) was added to a Schlenk flask, which was degassed and purged with nitrogen.

Add 3 mL of THF into Schlenk flask to dissolve the catalyst. This solution was purged with nitrogen to 3 mL of ZrP solution (ZrP concentration 10 mg/mL), then transfer the ZrP solution into the Schlenk flask with catalyst solution (ZrP-catalyst concentration=5 mg/mL). This was stirred for 15 minutes to fully immobilize the catalyst onto the ZrP surface.

In the meantime, purify cyclooctene monomer by passing through a basic $Al_2O_3$ column to remove the impurities and stabilizers. A monomer solution with 0.5 g (0.59 mL) cyclooctene, 4.5 mL THF (cyclooctene 1 mol/L), 0.1 g butylated hydroxytoluene (BHT) (10 mol. % to monomer) was prepared.

Hexane (20 mL) was added to a centrifuge tube and purged with nitrogen. Transfer the ZrP-catalyst solution into the hexane and centrifuge at 5000 rpm for 4 minutes to remove the free catalyst. The upper solution was discarded and re-dissolved in 6 mL THF. After purging with $N_2$ for 2 min, the solution was transferred to the degassed Schlenk flask using a syringe. Purge $N_2$ into the prepared monomer solution for 2 minutes, then transfer into the stirring ZrP-catalyst solution in Schlenk flask. This was allowed to react for 2 hours at room temperature. Add 1 mL ethyl vinyl ether to terminate the polymerization and remove the catalyst from the chain ends. Stir for 15 minutes. Dilute and precipitate the ZrP-g-PCO (polycyclooctene) solution in methanol and wash 3 times to remove the catalyst and the unreacted monomers or oligomers. The ZrP-g-PCO was re-dissolved in xylene at a concentration of (PCO 5 mg/mL) and stored in a freezer (−20° C.) to prevent PCO crosslinking.

Hydrogenation procedure. The ZrP-g-PCO solution was transferred to a 3-neck flask at room temperature with stirring and nitrogen flow for 30 min. The three necks were connected to nitrogen, reflux condenser and sealed with rubber stopper.

To this flask was added 1 g BHT (1 molar equiv. to double bond), 2.5 g p-toluenesulfonyl hydrazide (TSH) (3 molar equiv. to double bond), 5 g tributylamine (TBA) (6.4 mL) (6 molar equiv. to double bond). This solution was heated to 115° C. and stirred for 2 hours. After allowing the solution to cool to room temperature, it was precipitated with methanol and centrifuged at 7000 rpm for 5 min and collect the sediment. Byproducts from the hydrogenation were removed together with the upper solution. This methanol purification was repeated 3 times.

While illustrative embodiments have been illustrated and described, it will be appreciated that various changes can be made therein without departing from the spirit and scope of the invention.

The invention claimed is:

1. A composition, comprising an exfoliated nanoplatelet functionalized with a non-polar moiety,
    wherein the non-polar moiety is associated with the exfoliated nanoplatelet through a functional group of a silane that is covalently coupled to the exfoliated nanoplatelet, wherein the non-polar moiety contains a hydrocarbon chain with at least 20 carbon atoms, and
    wherein the non-polar moiety is produced by an olefin metathesis reaction.

2. The composition of claim 1, wherein the non-polar moiety is produced by a ring-opening olefin metathesis reaction in the presence of a transition metal catalyst.

3. The composition of claim 2, wherein the ring-opening olefin metathesis reaction is a reaction between an alkene covalently coupled to the exfoliated nanoplatelet and a cycloalkane, wherein the alkene is selected from the group consisting of a vinyl group and cyclic and polycyclic olefins.

4. The composition of claim 1, wherein the exfoliated nanoplatelet is derived from a natural or synthetic nanoclay.

5. A film, comprising the composition of claim 1.

6. A nanocomposite composition, comprising a mixture of the composition of claim 1 and a polymer derived from ethylene or propylene.

7. A film, comprising the nanocomposite composition of claim 6.

8. A lyotropic suspension, comprising the composition of claim 1 and an organic medium.

9. A method for producing a functionalized exfoliated nanoplatelet, comprising:
   (a) covalently coupling a silane to an exfoliated nanoplatelet, wherein the silane has a functional group for associating a polymer to the exfoliated nanoplatelet, wherein the polymer comprises a hydrocarbon-chain with at least 20 carbon atoms; and
   (b) associating the polymer to the exfoliated nanoplatelet through the functional group of the silane, wherein the polymer is produced by an olefin metathesis reaction.

10. The method of claim 9, wherein the functional group of the silane is a hydroxy group or an amine group.

11. The method of claim 9, wherein the functional group of the silane is an alkene group.

12. The method of claim 9, wherein the polymer is a polymer derived from ethylene or propylene.

* * * * *